(12) United States Patent
LaSala

(10) Patent No.: US 11,565,161 B2
(45) Date of Patent: Jan. 31, 2023

(54) TRAINING AID AND ALERT

(71) Applicant: Connecticut Scientific LLC, West Hartford, CT (US)

(72) Inventor: Anthony LaSala, West Hartford, CT (US)

(73) Assignee: CONNECTICUT SCIENTIFIC LLC, West Hartford, CT (US)

( * ) Notice: Subject to any disclaimer, the term of this patent is extended or adjusted under 35 U.S.C. 154(b) by 0 days.

(21) Appl. No.: 16/895,359

(22) Filed: Jun. 8, 2020

(65) Prior Publication Data

US 2020/0384335 A1   Dec. 10, 2020

Related U.S. Application Data

(60) Provisional application No. 62/858,669, filed on Jun. 7, 2019.

(51) Int. Cl.
*G06F 3/01* (2006.01)
*A63B 69/36* (2006.01)
*G06F 3/16* (2006.01)
*G06F 1/16* (2006.01)

(52) U.S. Cl.
CPC .......... *A63B 69/3608* (2013.01); *G06F 3/016* (2013.01); *G06F 3/16* (2013.01); *G06F 1/163* (2013.01)

(58) Field of Classification Search
CPC ........ A63B 69/3608; A63B 2024/0068; A63B 2220/62; A63B 2220/24; A63B 2071/0655; A63B 2071/0625; A63B 2225/09; A63B 2220/51; A63B 71/0622; A63B 2071/0694; A63B 2220/836; A63B 2209/10; A63B 2220/801; A63B 2225/50; A63B 2071/065; G06F 3/16; G06F 3/016; G06F 1/163; G06F 1/169; G06F 1/1684
See application file for complete search history.

(56) References Cited

U.S. PATENT DOCUMENTS

| | | | |
|---|---|---|---|
| 2,064,603 A | 12/1936 | Harrison | |
| 3,350,100 A | 10/1967 | Carmines | |
| 3,801,108 A | 4/1974 | Murray | |
| 4,222,569 A * | 9/1980 | DeMascolo | A63B 69/0046 473/213 |
| 5,108,103 A | 4/1992 | Rilling | |

(Continued)

FOREIGN PATENT DOCUMENTS

JP   6447917 B2   1/2019

OTHER PUBLICATIONS

Top Speed Golf—Clay Ballard, Screen Shot of "Best Golf Lag Drill" YouTube video, Jul. 8, 2019, https://www.youtube.com/watch?v=2r2rhwbFgGE, accessed Jun. 9, 2020, 1 page.

(Continued)

*Primary Examiner* — Yongjia Pan
(74) *Attorney, Agent, or Firm* — McCarter & English, LLP

(57) ABSTRACT

A golf training device and method indicates the proper position and/or motion of the golfer's trail wrist during the club downswing. The device may detect that desired DWLA is attained and provide real-time alerts of same. The device may provide positive feedback in the form of an auditory, tactile, visual and/or other signal.

18 Claims, 19 Drawing Sheets

(56) References Cited

U.S. PATENT DOCUMENTS

| | | | | |
|---|---|---|---|---|
| 5,209,481 | A * | 5/1993 | DeBack | A63B 21/4047 |
| | | | | 473/220 |
| 5,324,038 | A * | 6/1994 | Sasser | A63B 24/0003 |
| | | | | 434/252 |
| 5,423,547 | A | 6/1995 | Puso | |
| 5,509,809 | A | 4/1996 | Clay | |
| 5,511,788 | A | 4/1996 | Manley et al. | |
| 5,607,361 | A * | 3/1997 | Mastandrea | A63B 69/3608 |
| | | | | 473/207 |
| 5,655,223 | A * | 8/1997 | Cozza | A63B 69/3608 |
| | | | | 2/905 |
| 5,743,806 | A * | 4/1998 | Brennan | A63B 69/0059 |
| | | | | 473/214 |
| 5,771,492 | A * | 6/1998 | Cozza | A63B 69/3608 |
| | | | | 2/161.2 |
| 5,823,886 | A * | 10/1998 | Murray | A63B 69/3608 |
| | | | | 473/213 |
| 5,827,126 | A * | 10/1998 | Lee | A63B 69/3608 |
| | | | | 473/213 |
| 5,876,292 | A * | 3/1999 | Hamilton | A63B 69/3608 |
| | | | | 473/213 |
| 5,895,326 | A | 4/1999 | Cozza et al. | |
| 6,001,023 | A * | 12/1999 | Sanchez | A63B 69/3635 |
| | | | | 473/217 |
| 6,719,639 | B2 | 4/2004 | Novosel | |
| 6,800,035 | B1 * | 10/2004 | Couch | A63B 69/3608 |
| | | | | 473/213 |
| 7,033,281 | B2 | 4/2006 | Carnahan et al. | |
| 7,602,301 | B1 * | 10/2009 | Stirling | A61B 5/1127 |
| | | | | 340/573.1 |
| 7,798,910 | B2 | 9/2010 | Leadbetter et al. | |
| 8,043,162 | B2 | 10/2011 | Sery | |
| 8,491,397 | B2 * | 7/2013 | Caldwell | A63B 69/0002 |
| | | | | 463/46 |
| 8,512,161 | B2 | 8/2013 | Dalbke | |
| 8,696,482 | B1 * | 4/2014 | Pedenko | A63B 71/0622 |
| | | | | 473/223 |
| 8,845,445 | B2 * | 9/2014 | Kim | A61B 5/1122 |
| | | | | 473/212 |
| 9,220,942 | B1 * | 12/2015 | Serkiz | A63B 69/3608 |
| 9,233,290 | B2 | 1/2016 | Woody | |
| 9,901,802 | B2 | 2/2018 | Nowicki | |
| 10,051,108 | B2 | 8/2018 | Bakir et al. | |
| 10,213,645 | B1 * | 2/2019 | Wu | A63B 71/0622 |
| 10,213,676 | B2 | 2/2019 | Nowicki | |
| 2002/0194668 | A1 * | 12/2002 | Kwon | A63B 69/3608 |
| | | | | 2/161.4 |
| 2004/0033843 | A1 * | 2/2004 | Miller, IV | A63B 24/0003 |
| | | | | 473/274 |
| 2006/0199659 | A1 * | 9/2006 | Caldwell | A63B 69/3623 |
| | | | | 473/221 |
| 2007/0010341 | A1 * | 1/2007 | Miettinen | A63B 69/3608 |
| | | | | 473/131 |
| 2007/0066415 | A1 * | 3/2007 | Hou | A63B 69/3608 |
| | | | | 473/219 |
| 2009/0298605 | A1 * | 12/2009 | Wiegers | A63B 69/3608 |
| | | | | 473/199 |
| 2011/0224009 | A1 * | 9/2011 | Shan | A63B 71/0622 |
| | | | | 473/213 |
| 2012/0088544 | A1 * | 4/2012 | Bentley | A63B 69/36 |
| | | | | 455/556.1 |
| 2012/0319858 | A1 * | 12/2012 | Tas | G08B 21/22 |
| | | | | 340/686.6 |
| 2013/0041590 | A1 * | 2/2013 | Burich | A61B 5/1118 |
| | | | | 702/19 |
| 2014/0342851 | A1 * | 11/2014 | Jackson | A63B 69/38 |
| | | | | 473/464 |
| 2015/0018111 | A1 * | 1/2015 | Nadkarni | G09B 19/0038 |
| | | | | 473/223 |
| 2015/0283448 | A1 * | 10/2015 | LaSala | G09B 19/0038 |
| | | | | 473/266 |
| 2015/0328523 | A1 * | 11/2015 | Heling | A63B 69/3608 |
| | | | | 473/213 |
| 2016/0174877 | A1 * | 6/2016 | Meltz | A61B 5/746 |
| | | | | 702/141 |
| 2016/0299570 | A1 | 10/2016 | Davydov | |
| 2017/0038839 | A1 | 2/2017 | Seth | |
| 2017/0043228 | A1 * | 2/2017 | Hunter | G06K 7/10009 |
| 2017/0312577 | A1 * | 11/2017 | Sisson | G09B 19/0038 |
| 2017/0354859 | A1 * | 12/2017 | Okazaki | A63B 71/0622 |
| 2018/0001184 | A1 * | 1/2018 | Tran | G06F 1/163 |
| 2018/0296878 | A1 * | 10/2018 | Copelan | G06F 1/3228 |

OTHER PUBLICATIONS

Eric Cogorno Golf, Screen Shot of "GOLF: The Secret To How The Right Wrist Works In The Golf Swing" YouTube video, Dec. 16, 2018, https://www.youtube.com/watch?v=HwW1ABPxYYk, accessed Jun. 9, 2020, 1 page.

Herman Williams Golf, Screen Shot of "Right Wrist Action in Golf Swing—Golf Lesson by Herman Williams Golf" YouTube video, Jan. 4, 2012, https://www.youtube.com/watch?v=jmtyfCv2_vg, accessed Jun. 9, 2020, 1 page.

Jtodora, Screen Shot of "Inductive Capacitive Sensors" YouTube video, Mar. 27, 2017, https://www.youtube.com/watch?v=JLilqVplo8s, accessed Jun. 9, 2020, 1 page.

Sheng Shen et al., "I am a Smartwatch and I can Track my User's Arm," MobiSys '16: Proceedings of the 14th Annual International Conference on Mobile Systems, Applications, and Services, Jun. 2016, pp. 85-96.

Alastair Cochran and John Stobbs, "Search for the Perfect Swing: The Proven Scientific Approach to Fundamentally Improving Your Game," ISBN 1-57243-729-4, pp. 62-78.

Tac Tic Wrist Over Glove Golf Swing Training Aid, Tac Tic, Item model No. FBA_Tac Tic Wrist, https://www.amazon.com/Tac-Tic-Wrist-Glove-Training/dp/B0006ODYX0/ref=sr_1_1?dchild=1&keywords=tac-tic-wrist&qid=1617908250&sr=8-1 accessed Apr. 8, 2021, 7 pages.

Golf Training Aid Bio Movement Trainer, SKU : NAJ0053, https://www.golfio.com/golf-training-aid-bio-movement-trainer/ accessed Apr. 8, 2021, 4 pages.

Sklz Hinge Helper Swing Trainer, https://www.hurricanegolf.com/sklz-hinge-helper-swing-trainer.html accessed Apr. 8, 2021, 4 pages.

Sure-Set by Dan Frost, https://www.golftrainingaids.com/products/sure-set accessed Apr. 13, 2021, 5 pages.

Power Hanger by Wally Armstrong (Adult or Compact), https://www.golftrainingaids.com/products/power-hanger accessed Apr. 8, 2021, 3 pages.

Golf Swing Training Aids—Golf Swing Lag Trainer and Golf Flat Wrist Trainer for Chipping, Slice and Full Swing, GolfJOC, Item model No. PL_FW_SKU6, https://www.amazon.com/GolfJOC-Power-Flat-Wrist-Trainer/dp/B004GZ4IWQ/ref=sr_1_1?dchild=1&keywords=golf+swing+training+aids+golf+swinging+trainer+and+golf+flat+wrist+trainer&qid=1617908993&sr=8-1 accessed Apr. 8, 2021, 8 pages.

IMPACT SNAP—Right Handed Golfer, https://impactsnap.com/collections/training-aids/products/impact-snap-golf-training-aid accessed Apr. 8, 2021, 4 pages.

Grip Secret Men's Golf and Women's Golf Training Aid for Power & Accuracy Golf Swing Trainer Improves Your Golf Swing Inspired by Ben Hogan Perfect Golf Accessories for Men and Women Who Play Golf, As Seen On TV, Item model No. GS01, https://www.amazon.com/Golf-Swing-Secret-Training-Accuracy/dp/B0714F5GP4/ref=sr_1_5?dchild=1&keywords=grip+secret+golf+training+aid&qid=1617909958&sr=8-5 accessed on Apr. 8, 2021, 10 pages.

The Key—by Gary Wiren, https://www.golftrainingaids.com/products/the-key-by-gary-wiren?variant=21154151878 accessed Apr. 8, 2021, 5 pages.

Wrist Trainer Golf Aid, Golf Around the World, Product Code: GAW-WTGA, https://www.intheholegolf.com/GAW-WTGA/Wrist-Trainer-Golf-Aid.html accessed Apr. 8, 2021, 3 pages.

"Golf Infomercial Products Exposed: I Bought $500+ of As Seen On TV Golf Stuff, and Here's What Happened", https://practical-golf.com/?s=b1-blue-strike+review accessed Apr. 8, 2021, 24 pages.

(56) References Cited

OTHER PUBLICATIONS

TOTAL GOLF TRAINER Arm—TGT Arm—Golf Training Aids—Train The Ideal Wrist Elbow and Arm Position Throughout The Golf Swing, Total Golf Trainer, Item model No. TGTARM, https://www.amazon.com/TOTAL-GOLF-TRAINER-Arm-Throughout/dp/B078JXVD6L/ref=sr_1_1?dchild=1&keywords=total+golf+trainer+arm+-+tgt+arm+-+golf+training+aid&qid=1617911483&sr=8-1 accessed Apr. 8, 2021, 8 pages.
Sklz Hinge Helper Golf Training Aid, Product Code: SKLZ-HH, http://www.thegolftrainingaidstore.com/SKLZ-HH.html accessed Apr. 13, 2021, 1 page.
Weekend Hobby Quest TV, Screen Shot of "Ben Hogan 1965 Shell Swing Compilation—Regular speed and Slow Motion Training Guide" YouTube video, Oct. 15, 2012, https://www.youtube.com/watch?v=_Rfs1EGVYKs accessed Apr. 14, 2021, 1 page.
Top Speed Golf—Clay Ballard, Screen Shot of "The Key Move In The Golf Swing That Never Gets Talked About" YouTube Video, Sep. 28, 2020, https://www.youtube.com/watch?v=SD3rpNIoxFw accessed Apr. 14, 2021, 1 page.
Dan Whittaker Golf, Screen Shot of "SWINGYDE—TRAINING AID REVIEW" YouTube Video, Dec. 10, 2016, https://www.youtube.com/watch?v=uxA8hVFeozc accessed Apr. 14, 2021, 1 page.
Golf Grouch, Screen Shot of "Golf Swings: Tiger Woods Slow Motion: Aug. 12, 2007" YouTube Video, Apr. 8, 2019, https://www.youtube.com/watch?v=qOr3tm8Bx94 accessed May 28, 2021, 1 page.
Matthew Parry GOLF, Screen Shot of "Sergio Garcia Golf Swing—Iron, Slow Motion, Volvo World Matchplay, Face On" YouTube Video, May 17, 2012, https://www.youtube.com/watch?v=Q-TnrnkxVVM acessed on May 28, 2021, 1 page.
Swing Click, World's No. 1 Golf Transition Trainer, Sep. 24, 2020, https://swingclickgolf.com/, retrieved from Internet Archive Wayback Machine https://web.archive.org/web/20200924091051/https://swingclickgolf.com/ on Apr. 13, 2021, 27 pages.
More Sure Golf Training Aid, Product Code: MSURE, https://www.intheholegolf.com/MSURE/More-Sure-Golf-Training-Aid.html, accessed May 28, 2021, 4 pages.
The Secret—Greg Norman's Golf Training Aid, https://www.amazon.com/secret-Greg-Normans-Golf-Training/dp/B00GOWPR10, accessed May 28, 2021, 6 pages.

* cited by examiner

TRAINING AID AND ALERT

CROSS REFERENCE TO RELATED APPLICATIONS

This patent application claims benefit under 35 U.S.C. § 119 to similarly-titled U.S. provisional application No. 62/858,669, filed Jun. 7, 2019, which is expressly incorporated by reference as part of the present disclosure.

FIELD OF THE INVENTION

The present disclosure relates practice/training devices and methods, such as golf practice devices, in particular to the practice of the golf swing from the top of the backswing through impact of the golf club face with the golf ball.

BACKGROUND

The modern professional golfer can greatly increase golf ball flight by increasing the speed of the golf club at impact with the golf ball by the proper motion of the trail wrist (right wrist for a right-handed golfer) during the downswing. The professional golfer accomplishes this by correctly timing the release of stored energy in the trail wrist at the point of impact of the golf club face with the golf ball. This proper wrist motion during the downswing is mastered by the forceful unhinging of the trail wrist during the downswing as the golf club approaches the golf ball. Various terms have been used to describe this motion including; "delayed hit," "delayed release," and, more recently, "Lag Tension" and "Lag." The term "Lag" is used herein to denote this motion. Proper and sustained Lag adds a second lever to the first lever formed by the downward motion of the golfer's arms as the golf club is pivoted around a fixed point of the golfer's upper body. By adding proper and sustained Lag to the first lever in the downswing, the golf club speed at the point of impact with the golf ball can be nearly doubled. This coordinated and timed motion of the trail wrist from the top of the backswing to impact with the golf ball is complex and heretofore difficult to master by the training golfer, especially without professional instruction. Because the average duration of this portion of the golf swing is typically less than about a quarter of a second, golf instructors are unable to directly visualize or perceive whether correct downswing trail wrist motion is obtained during the training of golfers. Stop frame video screening of sufficiently high speed and resolution is required for the golf instructor to determine the trainee's wrist motion and correct the faulty motion of the student's trail wrist during the downswing.

The human wrist joint can only move in two planes. The first plane is in the anterior to posterior direction. Dorsal extension (hinging), motion in the anterior direction, allows the dorsum of the hand to move anteriorly from zero degree, unhinged, to about seventy degrees, fully hinged, when the flat plane of the dorsum of the hand is referenced to the flat plane of the anterior surface of the forearm. Dorsal hinging is thereby measured at the dorsal wrist joint angle (referred to herein as "DWJA") formed between the flat plane of the dorsum of the hand and the flat plane of the anterior surface of the forearm at the trail wrist joint. The reciprocal movement of the wrist in this plane in a posterior direction is known as palmer flexion. Motion of the trail wrist with palmer flexion must be avoided during the golf swing from the top of the backswing to impact.

The second plane that the wrist can move is in the superior to inferior direction. Wrist motion in the superior direction is known as radial deviation. The angle for radial deviation is measured from a flat plane along the superior aspect of the base of the thumb in reference to a flat plane along the superior side of the wrist. The normal range of this angle is between zero degrees (uncocked) and a maximal angle of about thirty degrees (cocked). The reciprocal movement of the wrist in this plane in the inferior direction is called ulnar deviation. Ulnar deviation during the downswing must be avoided.

Pronation (thumb rolls toward the body) and supination (thumb rolls away from the body) of the forearm at the elbow joint passively moves the wrist and the hand as a single unit. These motions are not true movements of the wrist joint. Pronation of the trail forearm (right side for a right-handed golfer) and the reciprocal supination of the golfer's lead forearm just at impact ensure the squaring of the golf club face at impact with the golf ball.

SUMMARY

The proper onset of Lag and its release just at impact of the golf club with the golf ball is difficult to teach and learn. Improper trailing wrist position and/or motion from the top of the backswing to and through impact with the golf ball is a common fault of untrained and lesser-skilled golfers and causes loss of golf ball distance, errant ball flights and frustration. There remains a need in the art for a helpful golf swing practice device that that does not rely on an instructor's real-time or video analysis of the trainee's swing and with which a trainee can self-teach proper Lag.

It is therefore an object to assist in the training of golfers in proper wrist position and/or movement during the downswing.

It is a further object to provide a device and method that does so.

It is yet a further object to provide a device that notifies a golfer that proper wrist position and/or motion during the downswing is being achieved.

It is yet another object that the device notifies the golfer with positive feedback.

An additional object is to provide a device that permits a golfer to self-train without a human instructor.

For purposes of this disclosure, the inventor has created the term "DWJA" (dorsal wrist joint angle) to describe the anatomical angle between the flat surface of the anterior forearm and the flat dorsal surface of the hand.

The inventor has performed analysis of video tapes at slow speed and stop-frame of legends of golf, including Ben Hogan, Sergio Garcia and Tiger Woods. The trailing wrist, starting at the top of the back swing, is maximally hinged (dorsal extension). This hinged angular position is then retained during the downswing and then quickly released during the golf club's impact with the golf ball. The correct hinging of the trail wrist from the top of the backswing until impact with the golf ball increases the golf club head speed and causes the golf ball to fly further and straighter. Present day golf instructors have long sought after a teaching aid to help them teach proper Lag and to teach the training golfer to sustain Lag up until impact of the golf club with the golf ball.

The inventor's analysis of high-speed photographs of Ben Hogan's golf swing from the top of the backswing to impact with the golf ball with the face of the golf club reveals that the trail wrist hinge angle (DWJA) at the top of Hogan's backswing is about seventy degrees. As Ben Hogan starts the downswing, the trail DWJA remains about the same until just before impact with the golf ball. Just before impact of the golf club with the golf ball, Hogan rapidly decreases the trail DWJA to twenty-five degrees and quickly decreases to less than twenty-five degrees just after impact with the golf ball. As Hogan quickly releases the trail wrist hinging, he pronates his trail wrist and supinates his lead wrist with his forearms and finishes his follow-through with a negative trail DWJA. Photo analysis of other professionals revealed that their DWJA decreases to about forty-five degrees starting from the golfer's waist position, but is still effective.

Accordingly, the ideal position of the trail wrist at the top of the backswing is so that the DWJA is at its maximum, optimally approximately seventy degrees of dorsal extension with a small amount of radial deviation of less than twenty degrees. As the downswing begins and the proper wrist positions are maintained, the golf club is pulled down and around the golfer's spine by the large muscles of the upper body During the downswing, the proper trail wrist hinge is to be maintained by the wrist muscles activated just enough to support the golf club. As the golfer's arms are further pulled down and the golf club is about the reach impact with the golf ball, the trail DWJA is optimally forcibly released. At this time, the trail wrist muscles activate and the pronating muscles of the trail forearm activate and release the stored torque of the sustained trail DWJA. The release of the stored torque generates a force that can nearly double the golf ball speed. During the active release of the trail wrist hinge, the DWJA optimally quickly reduces to less than twenty-five degrees.

However, the ideal timing of the trail DWJA release at the point of impact of the golf club with the golf ball is extremely difficult to master and difficult to teach without video tape analysis. Further, while the foregoing are preferred or ideal conditions, the inventor has determined by analysis, including analysis of downswings of professional golfers, that a desired trail DWJA from the top of the backswing to impact with the golf ball is twenty-five degrees or higher.

In some aspects, a golf aid, configured as a watch-like device, is worn on the golfer's trail wrist that is able to track this hinge angle from the top of the backswing to impact with the golf ball and alert the golfer that the hinge angle is correct and sustained. The device alerts the golfer when the desired trail wrist hinge angle is obtained (or exceeded) at the top of the backswing and how long the golfer sustains the desired hinge angle (or greater) during the downswing until impact of the golf club with the golf ball. In some such embodiments, the alert persists from the start of the backswing and is sustained until just after impact with the golf ball when the desired DWJA is maintained. Embodiments that provide sustained positive feedback, e.g., in the form of an auditory, visual and/or vibratory (or other tactile) alert thus indicate the period/duration of proper Lag or DWJA.

In at least some embodiments, the device electrically activates an alert giving positive feedback when the DWJA is equal to or greater than about +25 degrees and stops alerting when the DWJA is less. In at least at least some embodiments, the device is configured to electrically activate a circuit by non-inertial or physical stimuli to provide a sensitive and reliable sensor to detect the trail DWJA.

In at least some embodiments, the device is configured to give negative feedback (no alert) when the proper trail DWJA, e.g., equal to or greater than twenty-five degrees, is not sensed from the top of the downswing to impact of the golf club with the golf ball. The device's circuit may be programmed to detect when the trail DWJA from the top of the downswing to impact of the golf club with the golf ball the downswing is equal or greater than twenty-five degrees and give the training golfer positive feedback (alert given).

In at least some embodiments, the golf swing practice device is attachable to a golfer's wrist(s) by way of an adjustable and/or elastic strap. In at least some embodiments, the device is watch-like in form or otherwise is portable, inconspicuous and can be worn on the trail wrist during a practice round of golf. In at least some embodiments, a rechargeable battery with minimal circuit load operates the proposed device, which avoids the need to replace the battery and minimizes the frequency of recharging.

In at least some embodiments, the golf swing practice device and alert indicates optimal trail wrist motion from the top of the backswing through impact of the golf ball by the golf club during both medium and full golf swings.

At least some embodiments have a proximity-activated sensor or sensors so that the device does not require a kinetic energy threshold to activate. This type of sensor(s) can provide reliable activation only when the desired trail DWJA or higher is present, helping prevent false notifications.

Some embodiments contain a motion-sensing device. The motion sensor of the motion sensing device is configured to detect and track the dorsal wrist joint angle (DWJA) during the motion of the trail wrist of the golfer during the golf swing from the top of the backswing though impact of the supported golf club with the golf ball. When the motion sensor of the motion-sensing device detects that the proper DWJA range has been obtained, the motion-sensing device activates a positive feedback circuit and the feedback circuit generates a positive feedback alert to the user. When the motion sensor fails to detect the desired "DWJA" range, no alert is given to the user, thus providing a negative feedback alert that the proper motion of the trail wrist was not accomplished during the golf swing from the top of the backswing through impact with the golf ball.

In at least some embodiments, the training device includes a timing device that tracks and informs the user of the duration of the time that the golfer has held the proper "DWJA" during the golf swing from the top of the backswing through impact with the golf ball. This timed duration is the trainee's "Lag Time."

In at least one aspect, a device includes a housing, a retainer attached to the housing and configured to retain the housing on a dorsal surface of a user's wrist, a sensor external to the housing and positioned to sense contact or proximity with skin of a dorsal surface of a user's hand attached to the wrist when a dorsal wrist joint angle of the wrist is at least a predetermined angle, and an alarm operatively connected with the sensor and configured to generate an alarm signal to the user when the sensor senses contact or proximity with said skin. In at least some such aspects, the alarm is configured to generate said alarm signal only when the sensor senses contact or proximity with the skin; the position of the sensor relative to the housing is adjustable so that the sensor senses the skin when the dorsal wrist joint angle is at least about the predetermined angle and not when the dorsal wrist joint angle is less than about the predetermined angle; the sensor is configured to sense proximity or contact with the skin when the skin is within about a half-millimeter from the sensor; the sensor includes a capacitive touch switch module; the alarm signal is auditory, visual and/or tactile, and in at least some such aspects, the volume of the an auditory portion of the alarm signal is selectively adjustable by the user; the device has a timer to time the duration of lag during a downswing of a golf club by the user; and/or the housing includes a display for displaying to the user a duration of lag time and how many alarm signals were generated by the alarm during said downswing.

In other aspects, a device includes a housing, first means for retaining the housing on a dorsal surface of a user's wrist, second means for sensing contact or proximity with skin of a dorsal surface of a user's hand attached to the wrist when a dorsal wrist joint angle of the wrist is at least a predetermined angle, and third means for generating an alarm signal to the user when the second means senses contact or proximity with said skin. In some such aspects, the first means includes a retainer, the second means includes a sensor, and the third means includes an alarm.

In yet other aspects, a method includes sensing with a sensor of a device located on a dorsal surface of a user's wrist contact or proximity with skin of a dorsal surface of a user's hand attached to the wrist when a dorsal wrist joint angle of the wrist is at least a predetermined angle, and generating an alarm signal to the user when the sensor senses contact or proximity with said skin. In some such aspects, the method includes not generating an alarm signal when the sensor does not sense contact or proximity with said skin; the sensing includes sensing proximity or contact with the skin when the skin is within about a half-millimeter from the sensor; the sensing includes using capacitance of the skin to sense said contact or proximity; the alarm is auditory, visual and/or tactile; and/or the method includes timing the duration of time that the sensor senses said contact or proximity during a downswing of a golf club by the user and/or the duration of time that the alarm generates an alarm signal during a downswing of a golf club by the user, wherein in some such aspects, said duration of time is displayed by the device.

Embodiments of the invention thus may provide information to the training golfer to learn the correct golf swing from the top of the backswing to impact with the golf club and the golf ball. Because the golf training device is able to sense or determine the correct DWJA from the top of the backswing to (or just past) impact and alert the unskilled golfer (trainee) of such, e.g., supply the golfer positive feedback when the correct DWJA range (about twenty-five degrees or greater) is obtained/maintained, the invention may be of great help to golf instruction, or for a golfer to practice/train. It can help reduce or eliminate frustration, expensive lessons and videotaping while allowing the trainee the ability to self-teach this important part of the golf swing. Nonetheless, invention may be useful at all skill levels.

Embodiments that may be worn during a round of golf, e.g., a practice round (golf rules may prohibit its use during official or tournament play), provide information during actual golf play. However, the device may be used during any training session, e.g., at a practice range, with or without an instructor. Embodiments that are compact, non-obtrusive, inconspicuous, do not interfere with the golfer's swing, and/or can avoid aesthetic concerns of the golfer provide further benefits.

Advantageously, one or more drawbacks and/or disadvantages of other devices and methods may be overcome by the invention. Some other devices utilize only negative feedback signals that alert the user when improper wrist action has occurred during the golf swing between the top of the backswing through impact with the golf ball. Other devices are bulky, obtrusive and difficult to place on the wrist or forearm. Others rely on a tactile alert between the device and the golfers' skin that is difficult to perceive, especially given the ultra-short duration of the portion of the golf swing involved. Others fail to be convenient in that they must be placed on a golf club in order to teach the golfer the proper motion of the wrist during this portion of the golf swing. The golfer is forced to replace the device for each golf club and realign the device on the club if the golfer wants to practice with multiple clubs. Yet others utilize a special golf glove, which may interfere with the golf swing due to its differences over a standard golf glove. Others fail to teach the proper motion of the trail wrist during dorsal extension or alert the golfer when the proper DWJA range is obtained during the golf swing from the top of the backswing through impact of the golf club with the ball. Other devices rely on sensors that are placed on the wrist and are electronically tracked during the portion of the golf swing of interest, and then only later available for viewing by a trainee, e.g., visually displayed on a separate computer. Thus, no feedback is given during the swing when feedback would be more helpful. Further, such systems require additional equipment, e.g., a separate computer, and the trainee will usually need a trainer or golf instructor to analyze and explain the tracked movement.

Those skilled in the art should thus realize that embodiments of the present invention are more convenient and less complex, non-obtrusive, inconspicuous and easily donned and removed, e.g., when in a form similar to that of a wristwatch. Accordingly, the present invention satisfies a need, for example, for a wrist-worn golf training device, that can be similar in form to a wristwatch, that alerts the user with a positive feedback in the form of an auditory, tactile, or visual display signal when the desired DWJA range is obtained during the motion of the trail wrist from the top of the back swing through impact of the golf ball with the golf club face. The signal can be robust and reliable, and in at least some embodiments user-adjustable. It can teach Lag and Lag duration in an improved manner. It can help eliminate abnormal trail wrist motion during this part of the golf swing, and help avoid frustration, injury and expensive golf instruction with videotaping.

Those of ordinary skill in the art should understand, though, that the invention is not limited to golf swings. The invention may be applied to other sports or activities where it is desirable to sense and provide feedback on an angle between the hand and forearm or lower arm, e.g., baseball, softball, basketball, hockey, lacrosse, etc. The device and/or the sensor can be configured and/or located so as to sense the relevant angle (which may be different from the DWJA) and when the desired angle (or angle range) is reached, e.g., the degree of bend/deflection. Those skilled in the art should understand what the relevant (anatomical) angle is and the angle/angle range (in degrees) to be sensed and feedback provided upon.

It should further be understood that the invention is not limited to bending/movement between the wrist and forearm, but may be applied to any relative movement between body parts, e.g., elbow, knee, etc. With respect to such applications, those of ordinary skill in the art should understand that the device may be configured to be secured or attached to the relevant body part, and the sensor configured/located to sense the relevant angle, movement or displacement.

Yet further, it should be understood that the invention is not limited to sports but can be used with virtually any other endeavor involvement movement, dancing (e.g., ballet) being but one example. The invention also can have industrial or commercial uses, wherein the device is configured to attach to a component of a machine or other device, and configured so that the sensor senses a movement that is desired to be tracked and an alert generated.

These and other advantages of the invention will become more readily apparent in view of the following detailed description of certain embodiments and accompanying drawings.

This summary is not exhaustive of the scope of the aspects and embodiments of the invention. Thus, while certain aspects and embodiments have been presented and/or outlined in this summary, it should be understood that the inventive aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow, but in any case are not exhaustive or limiting.

It should also be understood that any aspects and embodiments that are described in this summary and elsewhere in this application and do not appear in the claims that follow are preserved for later presentation in this application or in one or more continuation patent applications.

BRIEF DESCRIPTION OF THE DRAWINGS

The foregoing and other features will be apparent from the following Detailed Description, which is understood not to be limiting, taken in connection with the accompanying drawings, in which.

DETAILED DESCRIPTION OF EMBODIMENTS

The present inventor has discovered that videos of many legends of golf, including Ben Hogan, Sergio Garcia and Tiger Woods reveal that the trail wrist starting at the top of the back swing during the golf swing is maximally hinged (dorsal extension). This maximum hinged position or angle must be retained during the downswing and then quickly released during the golf club's impact with the golf ball. The correct movement of the trail wrist (right wrist for a right-handed golfer) from the top of the backswing to and through impact causes the golfer to greatly accelerate the club head and causes the golf ball to fly further and straighter. Modern golf instruction teaches this hinging and unhinging of the wrists on the downswing as Lag Time or Lag Tension. A golf device worn on the golfer's trail wrist that is able to track this hinge angle from the top of the backswing to and through impact and alert the golfer when the motion is correct would be a boon to golf instruction and training. The device described herein is able to alert the golfer when the desired hinge angle is obtained and how long the golfer is able to sustain the desired hinge angle. The alert should persist from the start of the backswing and be sustained until just after impact with the golf ball. The device is configured to electrically activate an alert giving positive feedback when the angle formed between the dorsal surface of the golfer's trail hand and the anterior surface of the adjacent forearm, the Dorsal Wrist Joint Angle (DWJA) is greater than +25 degrees and stop alerting when the DWJA is less than +25 degrees.

Stop frame high speed photographs of Ben Hogan's golf swing from the top of the backswing to and through impact as analyzed by the inventor, reveal that the DWJA at the top of Hogan's backswing is +87 degrees and decreases to +72 degrees at his hip level, then it rapidly decreases to +48 degrees just at impact and quickly decreases to +25 degrees just after impact with the golf ball. Abnormal trail wrist motion from the top of the backswing to and through impact with the golf ball causes loss of golf ball distance, errant ball flights and frustration. The device is configured to give negative feedback when the proper DWJA is not sensed either electronically or mechanically. The golf training device is programmed to detect when the DWJA is +25 degrees. The golf training device emulates the golf swing of golfing legends from the top of the backswing to and through impact with the golf club and the golf ball.

Figure 1:
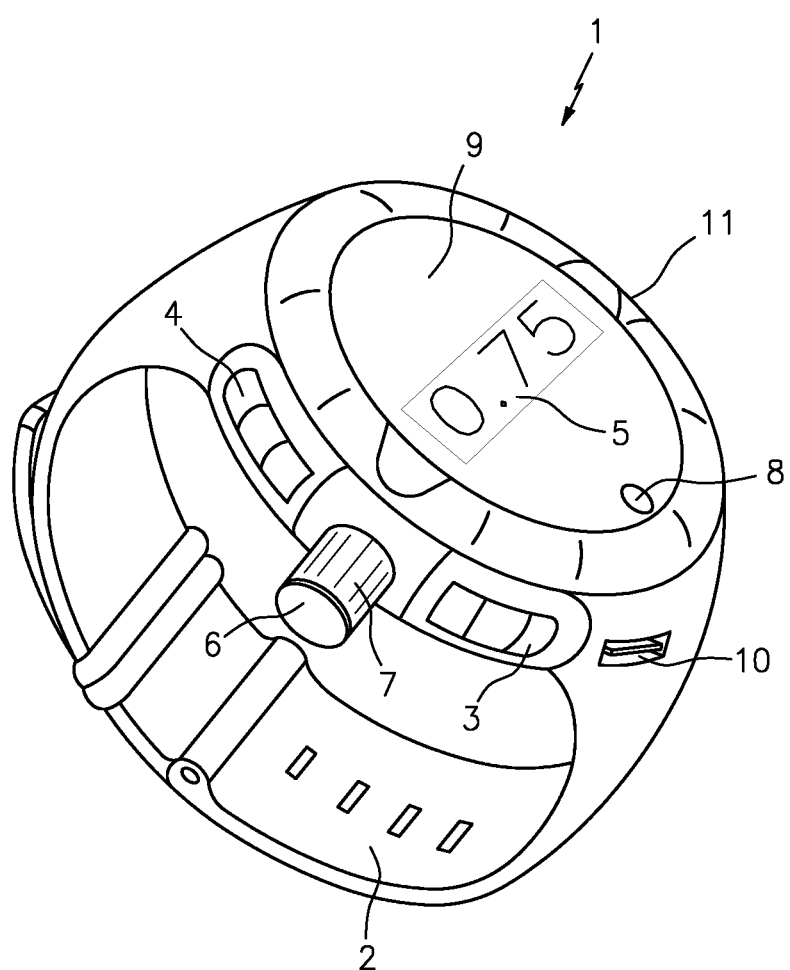
FIG. 1 is a top perspective view of a first embodiment of a golf training device.
Figure 2:
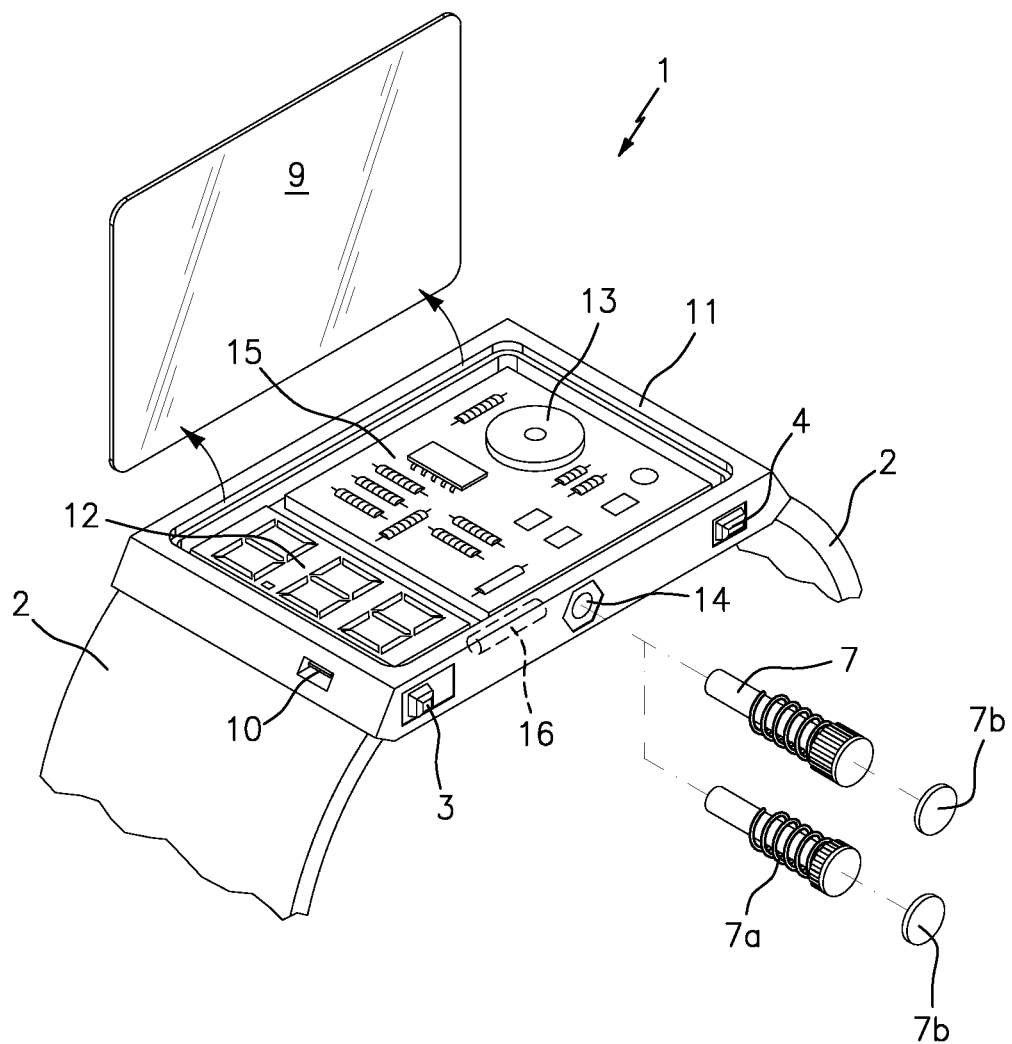
FIG. 2 is a top, perspective, partially-exploded view of a second embodiment of a golf training device.

Referring now to FIG. 1, an exemplary embodiment of a golf training device 1 configured to be worn by a user similar in form of a wristwatch is shown. As shown in FIG. 1, the golf training device 1 has an attachment device or retainer 2, in this embodiment a strap, made from, for example, cloth, rubber and/or an elastic material. The strap 2 holding the enclosure or housing 11 fastens or retains the device 1 to the golfer's trail wrist, e.g., with the housing 11 on or against the dorsal surface thereof, by way of a hook and looped material (e.g., VELCRO) or another suitable mechanism, which may be similar to that of a watch band, using, e.g., a buckle, clamp, snap(s), bar and hole, laced ties, snap-fit buckle, slide, or other type of connector. The strap 2 may be adjustable and in sufficient in length(s) to accommodate various sizes of users' wrists. An electrical circuit 15 located inside the housing is seen in FIG. 2. The various electrical components mounted in the device enclosure 11 are described further below.

As shown in FIG. 1, there are various external components device 1 including an on/off switch 3 configured to selectively place the power source 16 in electrical communication with other electrical components. Shown in FIG. 1 is a "lag time" activation switch 4 that electronically displays a readout 5, which may be digital, including, e.g., the elapse time in seconds and/or the device alerts made when the proper sensed trail wrist angle is detected. The device 1 has a touch plate sensor 6 that, when the golfer's dorsal surface (skin) of the trail hand makes contact with the sensor 6, the device is activated and alerts the golfer or trainee that the correct DWJA is obtained. The touch plate is attached to a stem 7 that may be adjustable to allow the device to properly fit an individual user and allow correct touch plate 6 sensing, e.g., the touch plate 6 contacted when the correct DWJA is obtained. A clear face cover 9 is attached to the top of the device enclosure 11 to protect the circuit 15 and allow a visual display of the "lag time" digital readout 5. A small circular port is located 8 located in the face cover 9. This allows the alerting device to transmit out of the device 1 an alert in the form of sound from within the enclosure. In at least some embodiments, the generated positive feedback alert alarm 13 may be visual, audible and vibratory in nature or a combination thereof, so as to afford positive feedback when the electrical circuit 15 of the training device detects the proper DWJA has been reached/maintained—from the top of the backswing to and through impact with the golf ball. The training device may include an LCD or other optical/visual indicator, such as an LED, light or screen or other forms of light, one or more speakers or audible indicators and/or a vibration motor or other tactile indicator to notify the user when the optimal trail wrist hinge position (DWJA) is obtained. A USB port 10 allows the user to easily recharge the power source, download saved data or to reprogram the circuit.

FIG. 2 shows another embodiment the device enclosure 11 in an exploded view with the electrical circuit 15 diagrammatically displayed. The electrical circuit 15 may be formed with wires and/or printed circuitry, or may be formed from other types of electrical circuitry. The clear protective face cover 9 has been removed. This embodiment has multiple touch plate stems 7 insertable into stem port 14. The touch plate stems 7 are adjustable with the use of a threaded screw mechanism and a spring 7a and may be of different lengths for different user's bodies (e.g., different sizes and shapes) to allow proper sensing of the touch plate 6 and the skin surface of the dorsal surface of the golfer's trail hand. An insulation barrier 7b can be attached to the touch plate stem 7 prevents false electrical alerts. Other embodiments use capacitance change because the sensing mechanism/circuit may be falsely activated when, without DWJA change, moist hair on the golfer's wrist during practice in hot humid or rainy weather touches the touch plate stem 7. The electrical circuit 12 for the digital display of "lag time" duration is shown.

Figure 3A:
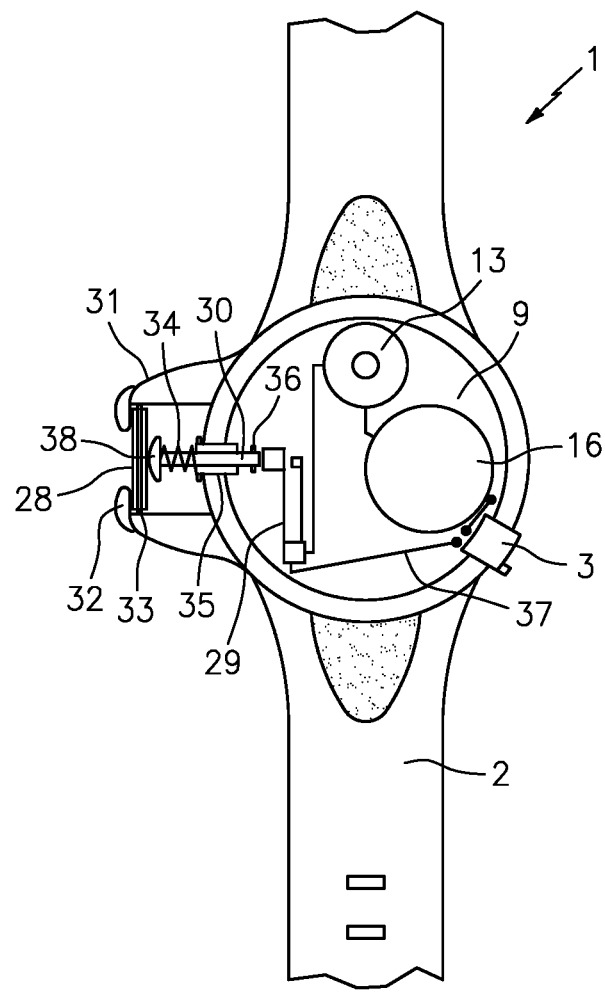
FIG. 3A is a top view of a third embodiment of a golf training device with its cover removed.
Figure 3B:
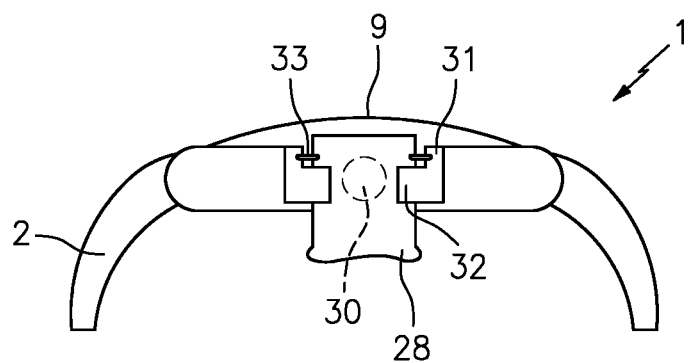
FIG. 3B is a left side view of the golf training device of FIG. 3A with its cover in place.

Turning to FIGS. 3A and 3B, another embodiment is shown. It depicts an externally attached mechanical mechanism that activates an electrical circuit 28 and produces a positive feedback alert in the form of an audible signal from the device alarm 13. When the proper DWJA is obtained from the top of the backswing to and through golf club impact with the golf ball, the dorsal surface of the golfer's trail hand makes contact with and pivots a push plate 28. The push plate 28 is suspended by way of a pivoting rod 33 supported by end brackets 31. The push plate 28 is prevented from pivoting beyond 180 degrees by way of holding brackets 32. The device is configured so that the push plate 28 will be pivoted inwardly only when the DWJA is greater than 25 degrees. The push plate 28 when in the non-pivoted position is in contact with a push rod 30. The push rod 30 is configured to move freely back and forth within a slot 35 formed in the device enclosure 11. The push rod 30 when not moved by the pivoting plate 28 remains in a fully externalized position in contact with the push plate 28 by a spring 34 placed around the push rod 30 between the push rod head 38 and the external opening of the slot 35. The push rod 30 is retained within the slot 35 by micro pins 36 inserted into the interior end of the push rod 30. When the dorsal surface of the golfer's trail hand makes contact with the push plate 28 when the proper DWJA is obtained, the push rod 30 is pushed inwardly by the pivoting push plate 28, which in turn displaces push switch 29 into a closed position to activate the electrical circuit 37 to cause an alert giving positive feedback. The electrical circuit 37 is configured to give continuous positive feedback when the proper DWJA is sensed form the top of the backswing to and through impact with the golf ball.

Figure 4:
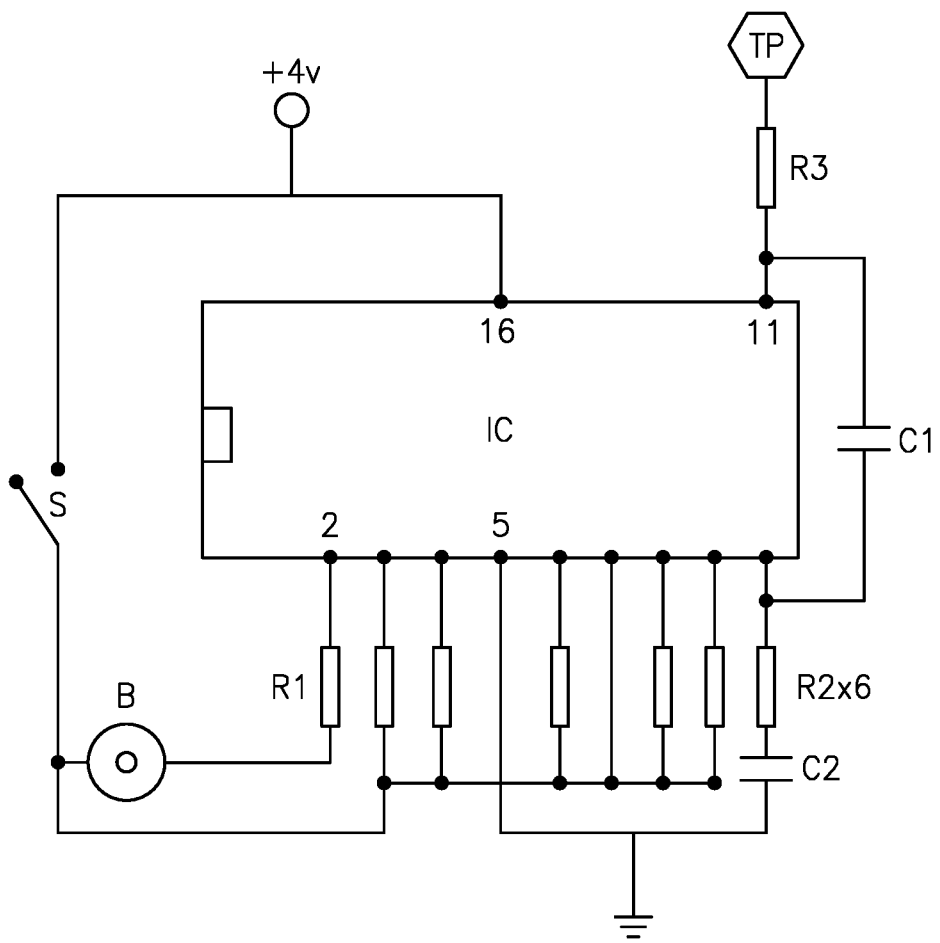
FIG. 4 is a schematic of a capacitive touch sensor circuit.

FIG. 4 schematically denotes a capacitive touch sensor circuit that electrically activates an alarm when the touch plate TP is in contact with (or at least sufficiently close proximity with) human tissue/skin so as to detect a change in the circuit's resting capacitance. Known touch sensor IC B6TS-04LT is shown in the figure, but any suitable touch sensor may be used as one skilled in the art would understand. A power source, here a 4 VDC rechargeable lithium battery is in electrical communication with an on/off switch S, a buzzer B, and the capacitive touch sensor circuit. When the device's on/off switch S is turned on, and the circuit is powered by the power source, the buzzer B will sound and remain sounding as long as the capacitive touch sensor circuit detects a change in the resting capacitance caused by contact/proximity of the touch plate by human tissue/skin. Alternative or in addition to the buzzer B, another suitable alerting device may be used, e.g., a light source, vibrator or other alerting component. The buzzer B or other alert device may be configured to be activated by in the above-described manner when the golfer's trail wrist is in a predetermined threshold or position. In embodiments configured to monitor/alert DWJA from the top of the backswing to and through impact of the golf club with the golf ball, a DWJA of about equal or greater than 25 degrees, when reached (and crossed), will cause completion of the circuit and activation of the alarm device. The alarm device, when activated, will alert the training golfer with positive feedback, e.g., an audible, visual or vibratory signal.

Figure 5:
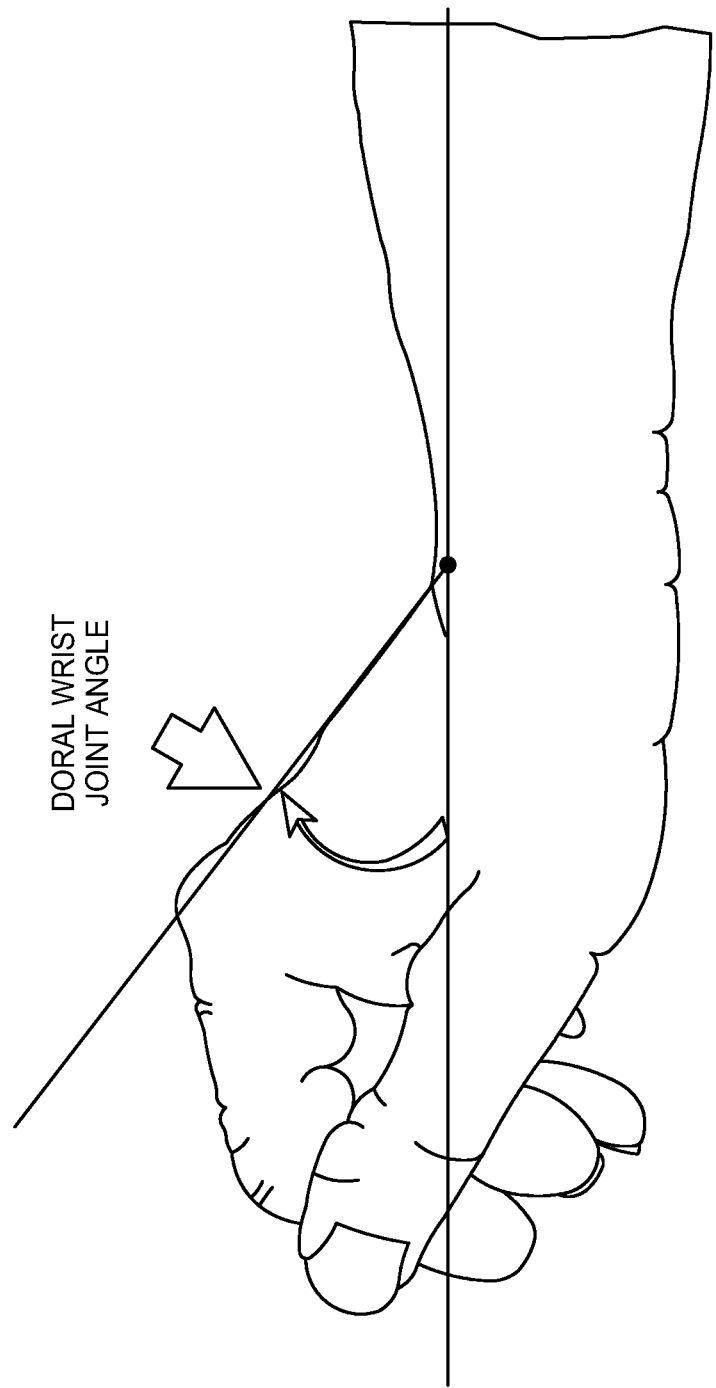
FIG. 5 is an annotated side view of a human hand and forearm.

FIG. 5 anatomically demonstrates the side view of a human hand and forearm. An angle that represents the "Dorsal Wrist Joint Angle" (DWJA) is shown. The DWJA is the angle formed between the dorsal surface of the hand and the adjacent surface of the forearm. In full or maximum dorsal extension, the DWJA is typically about seventy (70) degrees. When the dorsal extension is fully removed, the DWJA is zero degrees. The device 1 is designed to electrically or mechanically sense this angle when the angle is about or greater than twenty-five (25) degrees, provide a positive feedback to the training golfer. The positive feedback alerts the golfer that the golf swing from the top of the backswing to impact of the golf club with the golf ball is performed correctly.

Figure 6:
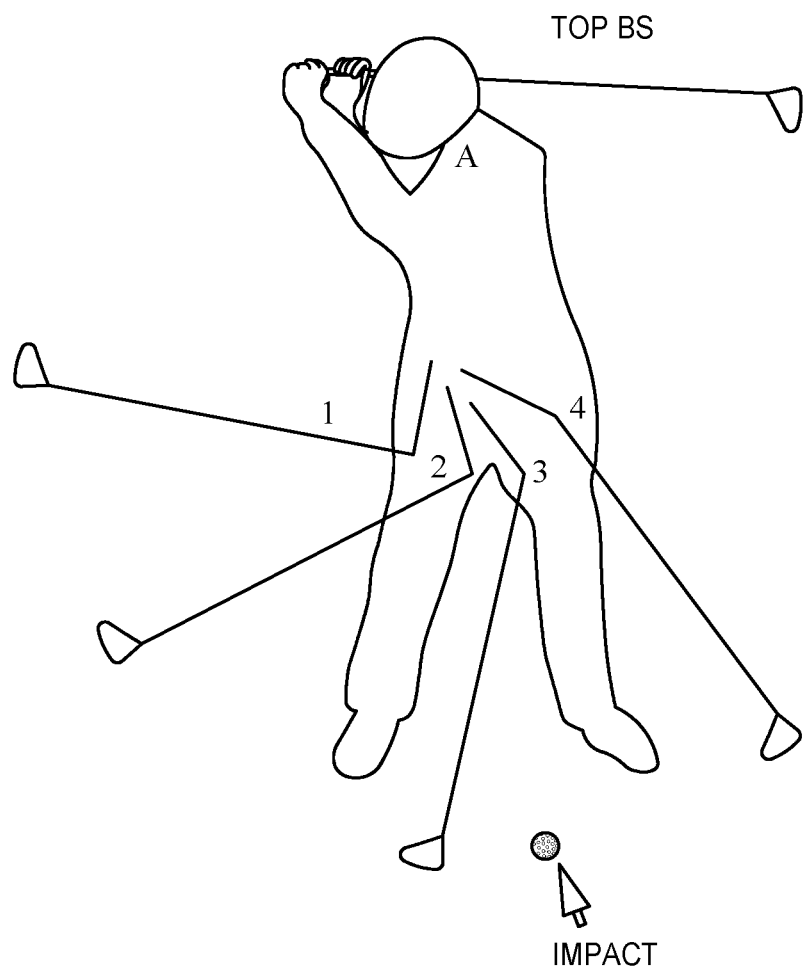
FIG. 6 is a schematic view of a golf swing showing the golf club in different positions.

FIG. 6 is a schematic drawing of the Dorsal Wrist Joint Angles (DWJAs) of a golf legend Ben Hogan (A) based on high-speed still photographs of Ben Hogan's golf swing, from the top of the backswing to and through impact of the golf club and the golf ball. The inventor calculated and carefully measured the DWJAs of the swing at various points during this part of Hogan's golf swing using high-speed stop frame photos. From the top of the backswing (TOP BS) to point 1, or hip level, the DWJA is 87 degrees. At the trail knee level 2, the DWJA has reduced to 72 degrees. Just prior to golf club impact with the ball 3, the DWJA is now 48 degrees. Just after impact with the golf ball, the DWJA is 25 degrees. A facsimile of a golf ball is shown to represent the position of ball impact.

Figure 7:
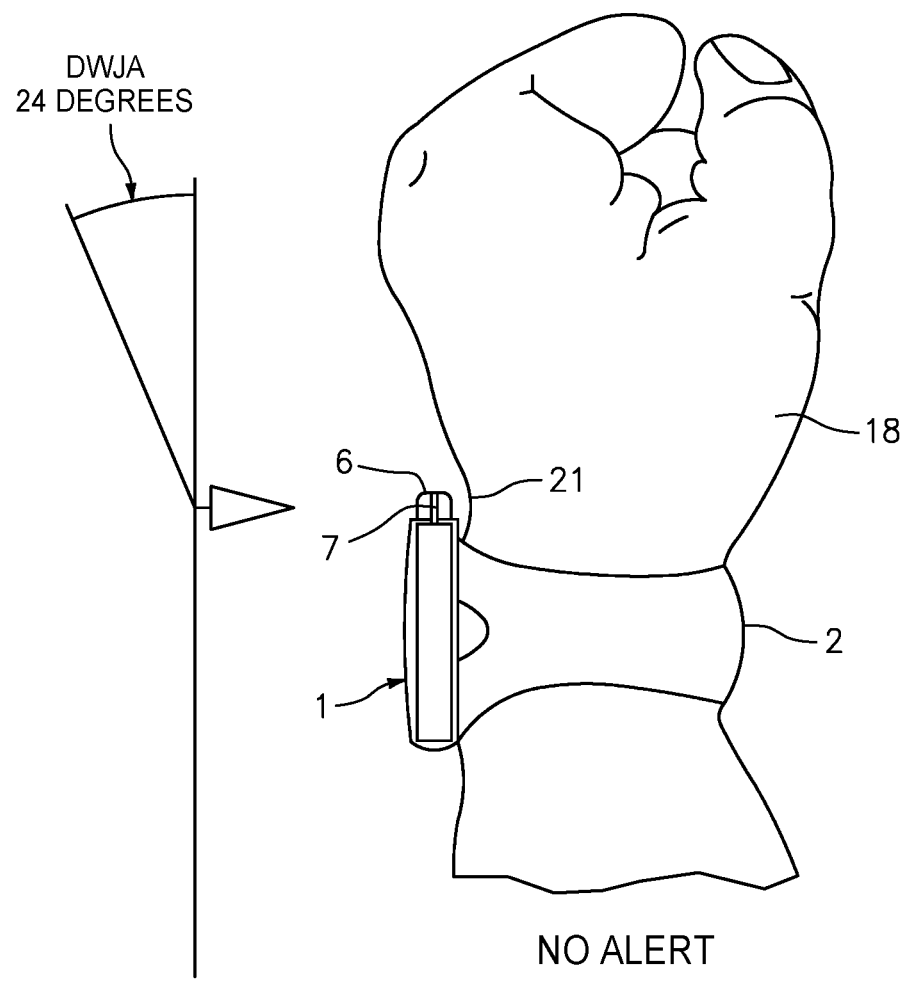
FIG. 7 is a side view of a hand, wrist and forearm, in which a golf training device is attached at the wrist.

FIG. 7 is another anatomical drawing depicting negative feedback when the predetermined threshold of a DWJA of 25 degrees presented, e.g., is not reached or crossed during the golf swing from the top of the back swing to and through impact of the golf club with the golf ball. In the illustrated embodiment, the DWJA is 24 degrees. The touch plate of the device is not in contact or sufficient proximity with the tissue of the golfer's dorsal surface 21 of the trail hand 18. The skin surface is not sensed by the device (in either electrically- or mechanically-based devices) and the device remains silent (and with no other alert), providing the training golfer negative feedback.

Figure 8:
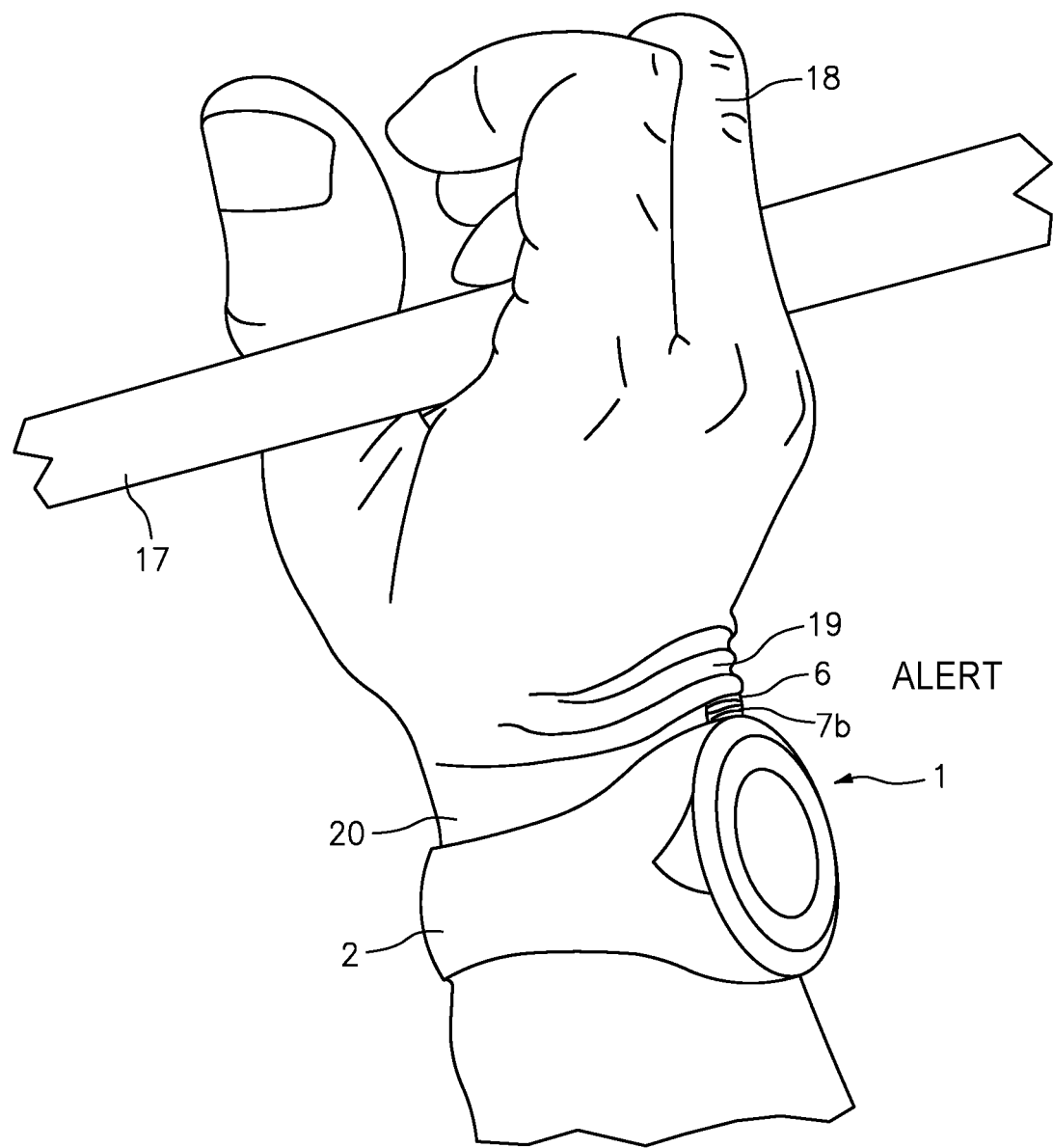
FIG. 8 is a dorsal perspective view of a hand, wrist and forearm, in which a golf training device is attached at the wrist.

FIG. 8 is another anatomically drawn diagram showing a golfer gripping a golf club 17 and a device 1 attached to a golfer's trail wrist 20 by way of an adjustable strap 2. The device is a form similar to an ordinary watch and is inconspicuous and non-bulky in comparison thereto. The adjustable touch plate stem 7 positions the touch plate 6 so that the tissue/skin 19 of the dorsal surface of the golfer's trail hand 18 touches the touch plate when the dorsal wrist joint angle (DWJA) meets or exceeds about 25 degrees. As shown, as the DWJA attains or exceeds 25 degrees, the tissue/skin over the dorsal surface of the golfer's trail hand contacts or is pushed into the touch plate as the skin moves or folds. The tissue contact then by electrical or mechanical forces activates the electrical circuit 15. The activated electrical circuit 15 of the golf training device 1 produces an alarm, giving the training golfer positive feedback that the golf swing from the top of the backswing to and through golf club impact with the golf ball has been performed properly with respect to DWJA.

Figure 9:
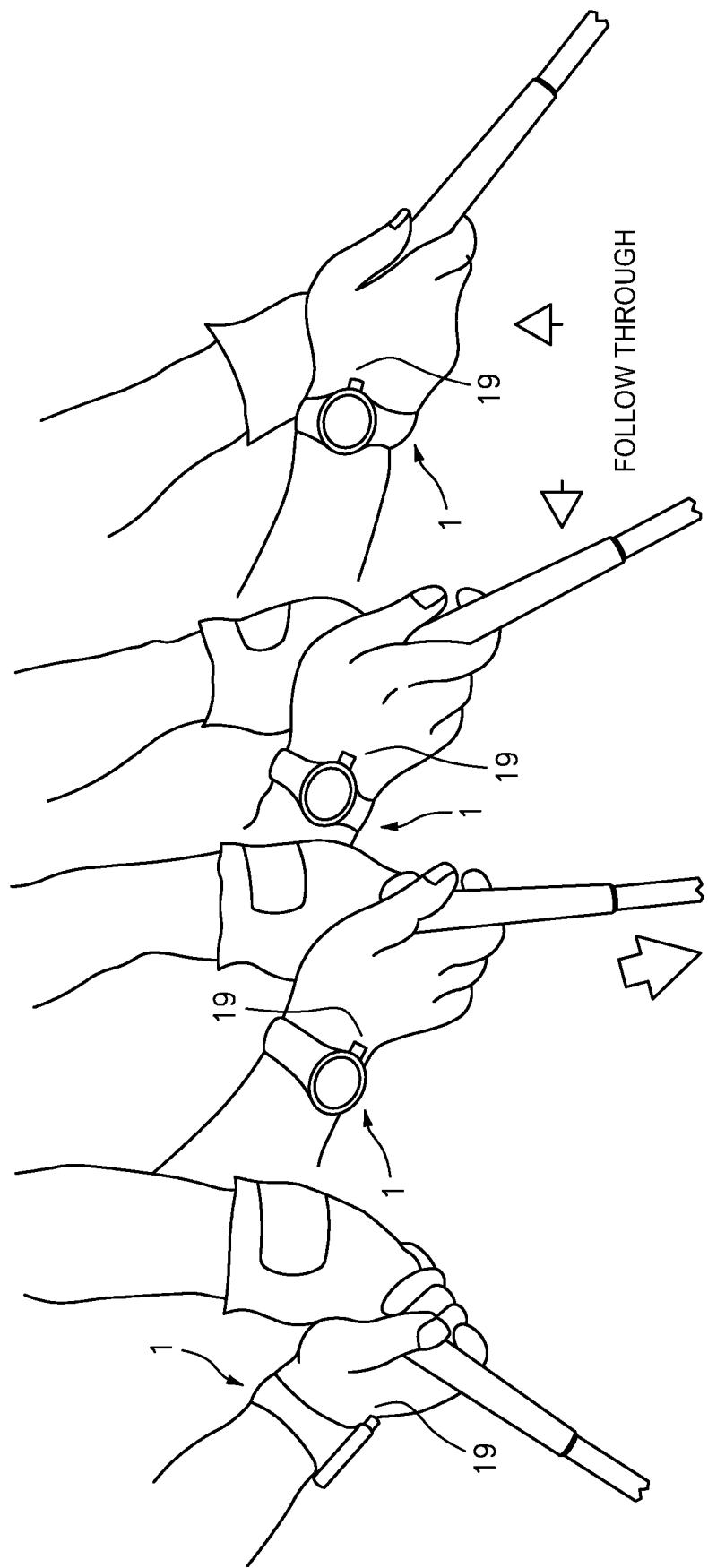
FIG. 9 is a view of a golf swing at different points in time.

FIG. 9 is yet another anatomically drawn description of the golf training device 1 used during the training of a golfer during the part of the golf swing from the backswing to and through impact of the golf club and the golf ball. Positions A and B reveals that, just prior to and just after impact (represented by the arrow) with the golf ball, respectfully, the golf training device 1 has been activated and is alerting the training golfer that the downswing DWJA was performed properly. In position C, after golf ball impact, and position D, the start of the follow through of the golf swing, the touch plate of the device is not in contact with the golfer's skin/tissue, the DWJA is less than twenty-five degrees, and no alert is sounded by the golf training device 1.

Figure 10:
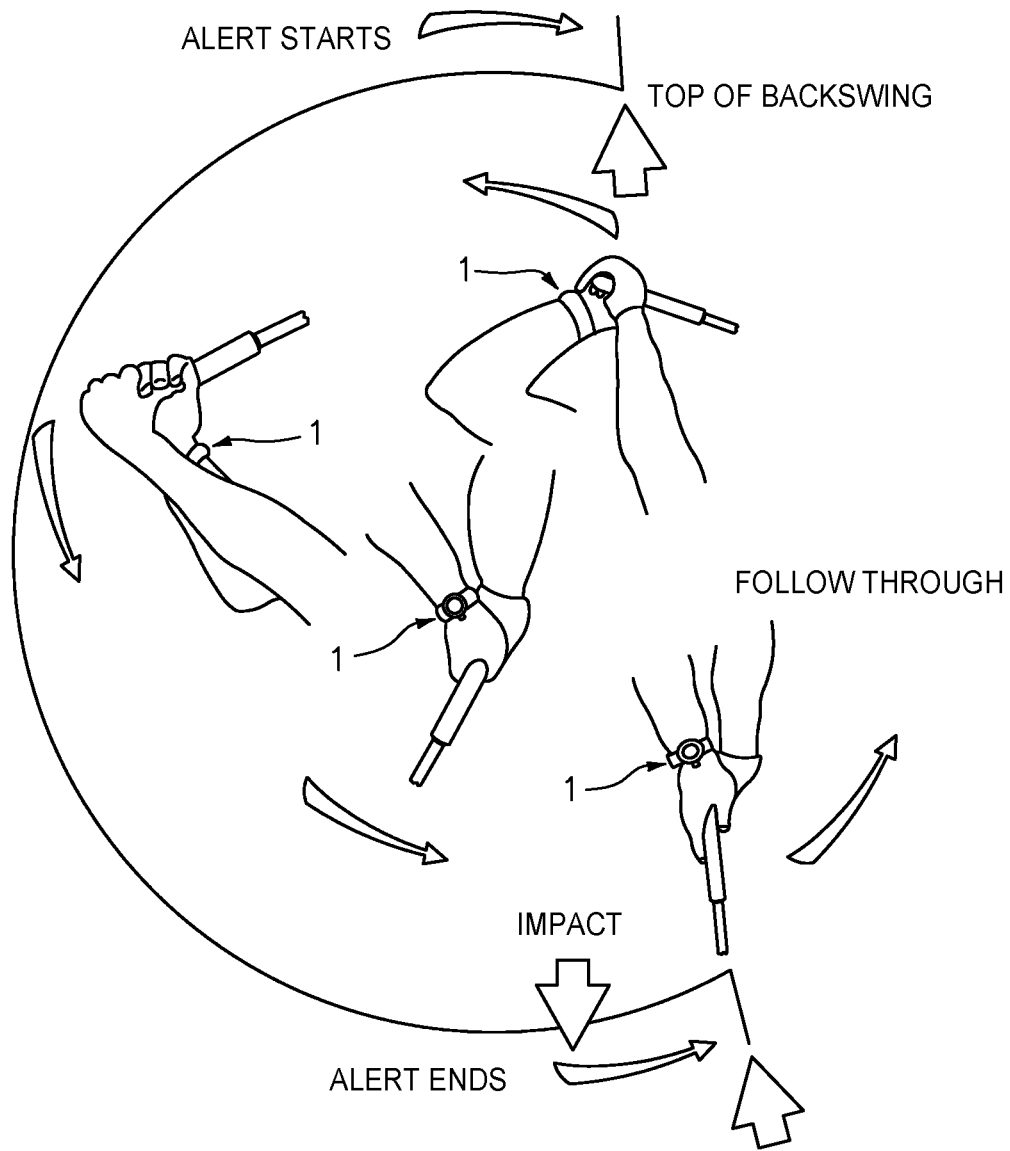
FIG. 10 is a schematic view of a golf swing at different points in time.

FIG. 10 schematically shows a golf swing at four different points during the swing. The DWJA at each point can be seen in the figure, as well as the device 1 on the wrist of the golfer. As indicated in the figure, the alert starts at the point in the backswing that exceeds the minimum DWJA for the sensor 6 to activate, e.g., twenty-five degrees, and continues to the top of the backswing (e.g., as the DWJA increases) and through the downswing until the DWJA decreases below the minimum or the alert ends.

Figure 11:
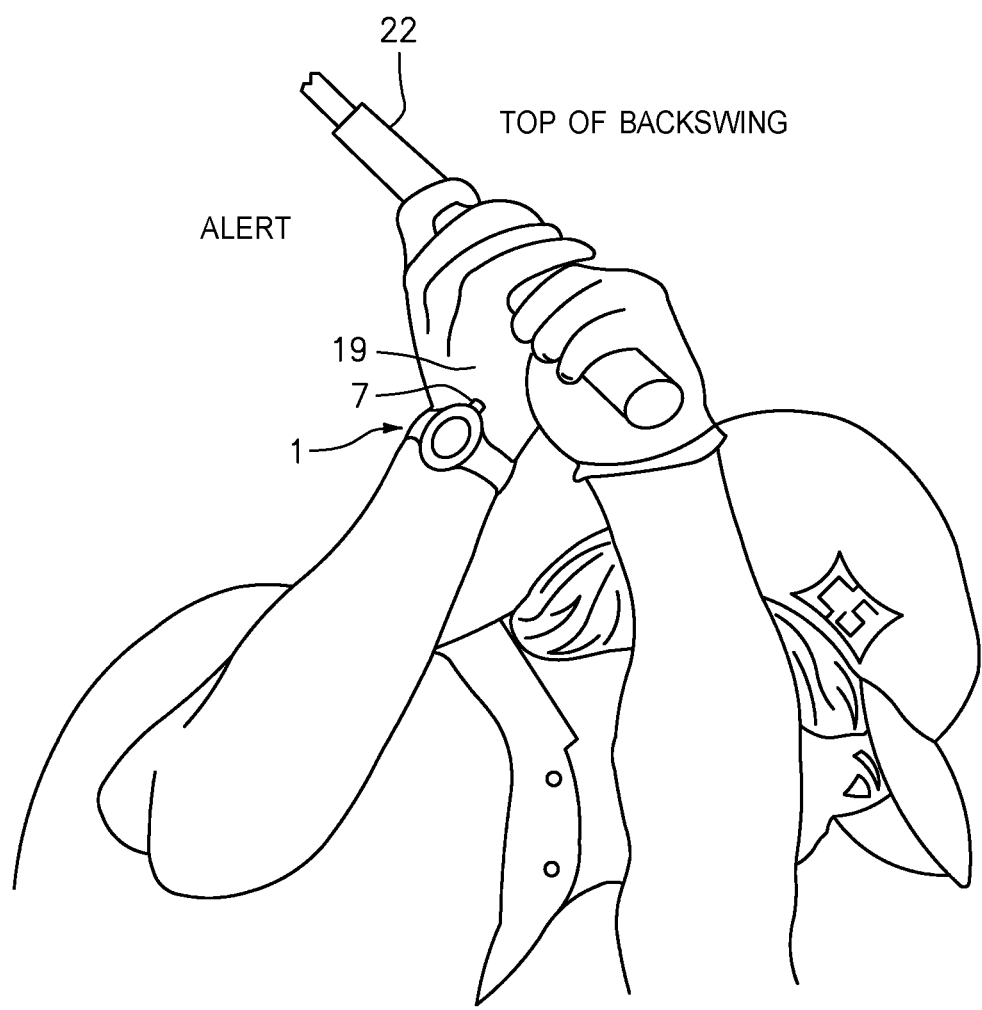
FIG. 11 is a schematic view of a golf swing at the top of the backswing.

FIG. 11 schematically shows a golf swing at the top of the backswing. As can be seen in the figure, the DWJA at the top of the backswing is sufficient for dorsal skin surface 19 to contact, actuate, or otherwise be sensed by the sensor 6 to activate the sensor 6 and trigger the alert.

Figure 12:
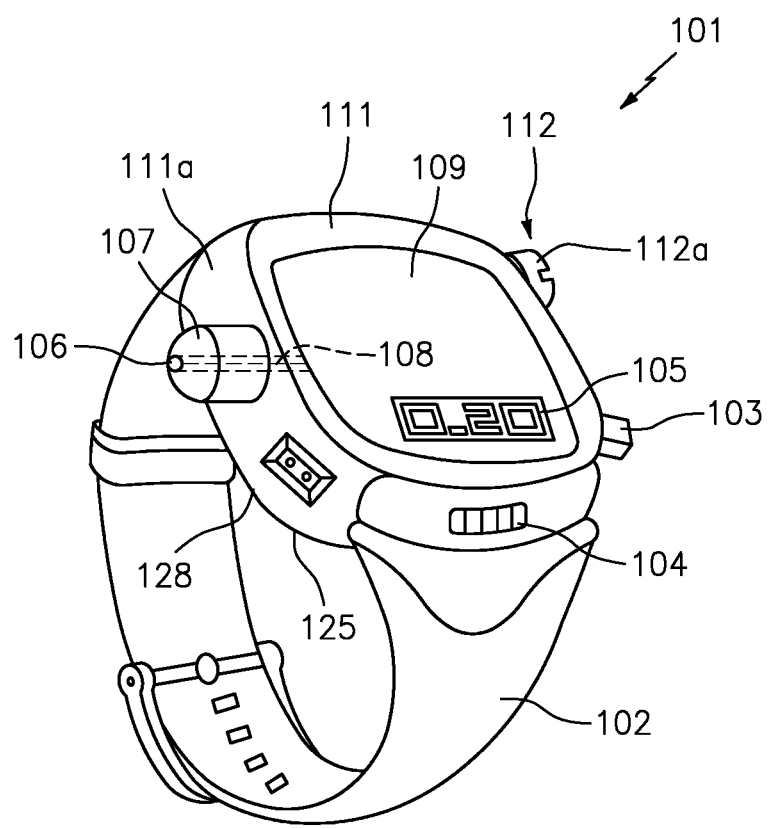
FIG. 12 is a top perspective view of a fourth embodiment of a golf training device.

FIG. 12 shows another embodiment of a golf training device 101. External components include a retainer 102 that fastens or retains the housing 111 of the device 101 to, on or against the dorsal surface of the golfer's trail wrist, which in this embodiment is a strap. An on/off switch 103 is configured to selectively place the power source 116 in electrical communication with other electrical components. A "lag time" activation switch 104 electronically displays as a digital read out 105 the elapse time in seconds the device 101 alerts to the golfer that the proper sensed trail wrist angle is detected. A touch electrode sensor 106 activates the alert when the golfer's dorsal surface (skin) 121a of the trail hand 121 makes proximity contact with the electrode sensor 106. Activation occurs only when the dorsal surface 121a of the trainee's hand 121 makes proximity contact with the touch electrode sensor 106 when the trail wrist hinge angle (DWJA) reaches or is greater than the desired angle, here twenty-five degrees. The device 101 then alerts the trainee that the correct DWJA is obtained.

The touch point electrode sensor 106 is sized and shaped to present a small surface area to the part of the dorsal surface area of the golfer's trail hand 121 that approaches the sensor 106. By limiting the surface area of the sensor 106, the signal zone between the small area electrode sensor 106 and the approaching dorsal surface 121a of the golfer's trail hand 121 provides a proximity sensing zone that is a small distance. That is, the touch point electrode sensor 106 will not activate until the dorsal surface 121a of the trail hand 121 is at or near the desired DWJA. In at least some embodiments, the electrode sensor 106 will activate when the skin surface is less than about a half-millimeter from the electrode sensor 106. The inventor has determined that, at this distance, a golfer's DWJA is acceptably close to the desired DWJA. The small sensing zone thus adds to the reliability of the capacitive touch switch module (CTSM) 118 used to activate the alarm. The touch electrode 106 is attached to a stem 108 that may be adjustable to allow the device 101 to fit a user properly and allow correct touch electrode sensor 106 sensing. The stem 108 and touch electrode 106 are both covered or shielded by a rubberized or other protective covering 107 that inhibits excess water vapor and dust from interfering with the capacitive proximity sensing. A clear face cover 109 is attached to the top of the device enclosure 111 to protect the housed circuit 115 and allow a visual display of the "lag time" digital readout 105.

In at least some embodiments, the generated positive feedback alert of the circuit 115 of the device 101 may audible or vibratory in nature or a combination thereof, so as to afford a perceptible positive feedback when the electrical circuit 115 of the training device 101 detects the proper DWJA that is to occur from the top of the backswing to impact with the golf ball. The device 101 may include an LCD or other optical/visual indicator, such as an LED, light or screen or other forms of light, one or more speakers or audible indicators, a vibration motor, and/or other tactile indicator to notify the user when the optimal or desired trail wrist hinge position (DWJA) is obtained.

In the illustrated embodiment, a volume-controlled sound generator 112 is placed so that the volume control 112b, in this embodiment a protrusion defining a thumb screw, protrudes beyond the forward side 111a of the enclosure 111, allowing the trainee to adjust the volume of the alert to a desired or sufficient alert signal volume. In other embodiments, the volume control is located at other positions on the device 101.

The device 101 has an electronic port 110, through which the user can recharge the power source 116, download saved data, and/or modify or reprogram the circuit 115. The port 110 may be any port suitable for one or more of the above functions that currently or later exist, as those skilled in the art would understand, such as, but not limited to, a USB port. In other embodiments, the device 101 has one port for delivering power to the device, and another for data exchange. In yet further embodiments, the device 101 has an inductive charger located inside the housing 111. Yet other embodiments have a wireless transceiver for wireless exchange of data between the device 101 and an external electronic or computerized device. Such wireless exchange may be made by one or more any suitable protocols now existing or later developed, as one of ordinary skill would understand, including but not limited to Wi-Fi, BLUETOOTH, RF (radio frequency), and/or optical (e.g., IR (infrared)).

Figure 13:
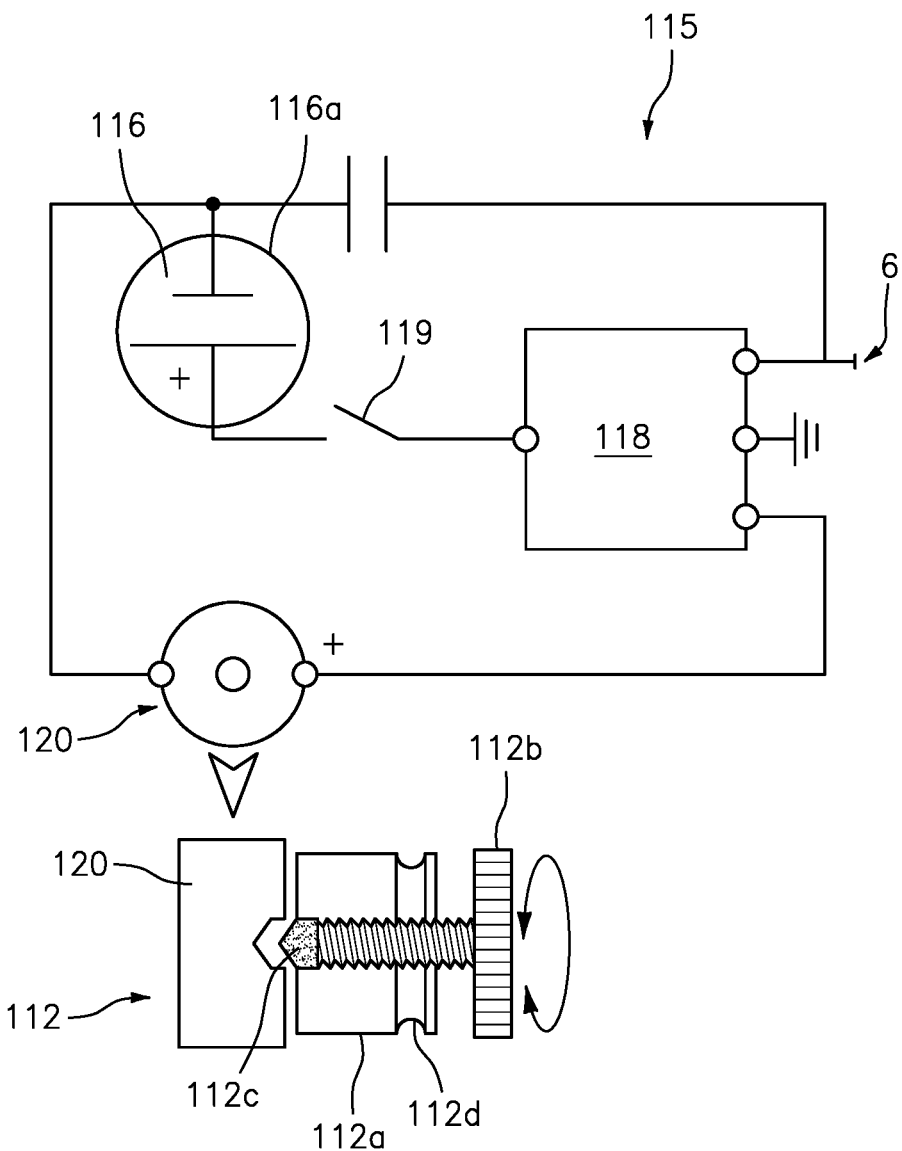
FIG. 13 is a schematic view of a circuit and sound generator of the golf training device of FIG. 12.

FIG. 13 schematically shows the electrical circuit 115 that may include wires, printed circuitry and/or chips. In the illustrated embodiment, the device 101 uses a human body's capacitance change to activate an alert signal. This phenomenon should be understood by those of ordinary skill in the art. When the trainee's dorsal surface 121a of the trail hand 121 enters the sensing signal zone of the touch electrode 106, e.g., when the trail DWJA is equal to or greater than twenty-five degrees, the alert is activated. The presenting surface area of the touch electrode 106 is configured to be as small as possible to lower capacitive hysteresis, thus providing the touch electrode 106 with more consistent sensitivity. The inventor has determined that a width/diameter of about one millimeter is sufficient.

A CTSM 118, for example, a TTP223 Touch Key Locking Module, normally open (NO), is used in the illustrated circuit 115 as the sensor circuit in the device 101. CTSM's are an improvement over previously-known wristwatch-like devices that monitor the angular position of the trail wrist because activation is not dependent on or vary based upon kinetic energy or contact force. The approaching skin of the trainee's dorsal hand surface 121a activates the sensing electrode 6. Therefore, the force of the skin/hand contacting the touch electrode 106 does not activate the module. Electromechanical Motion Sensors (MEMS) rely on kinetic energy or a physical force for activation, which can cause false negative feedback responses, e.g., failure to activate the alarm although the desired position is reached.

A power source 116, which may be a re-chargeable or replaceable lithium button-cell battery or any other suitable power source, powers the circuit 115 and is controlled/modulated by an on/off circuit 119 operatively connected to the external switch 103. In the illustrated embodiment, the battery 116 is located in a battery housing or receptacle 116a, which holds the battery 116 therein. In embodiments where the power source 116 is replaceable, the power source 116 may be accessed and removed, and a new power source installed, by opening the housing 111. In some embodiments, the cover 109 can be removed to provide access to the interior of the housing 111. In other embodiments, a removable plate 125 on the bottom of the housing 111 can provide access to the interior. In at least some such embodiments, the plate 125 is removably retained to the housing 111 by retaining screws (not shown). However as those skilled in the art should appreciate, the plate 125 may be removably retained to the housing 111 by any suitable retainer(s) or retention mechanism. In some embodiments, the outer surface of the removable plate 125 includes a moisture absorbing or moisture barrier material 128 to prevent moisture, e.g., from the user's skin, from reaching the interior of the housing 111, which might affect internal components, such as the sensing of the circuit 115. The material 128 may also be configured to add comfort and/or stability (anti-slip) to the device when worn by the user.

The signal alert system, activatable by the circuit 115, includes the sound generator 112. In the illustrated embodiment, the sound generator 112 incorporates a micro-mini continuous piezo buzzer 120 (3-5 DC volts) adjacent to a thumbscrew housing 112a. The thumbscrew housing 112a guides a thumbscrew 112b with a sound-blocking or sound-insulating tip 112c (having, for example, a felt material or other blocking or insulation material) on or at the interior end of the thumbscrew 112b toward/into and away from/out of the buzzer's 120 sound port 120a. Sound emitted by the buzzer 120 is directed into and through the thumbscrew housing 112a and exits out of one or more sound ports 112d of the housing 112a into the environment. Rotating the thumbscrew 112b, e.g., clockwise, so that the felt tip 112c moves toward/into the sound port 120a muffles the sound port 120a, decreasing the volume of the activated buzzer 120. Opposite rotation, e.g., counter-clockwise turning, of the thumbscrew 112b moves the felt tip 112c out of/away from the buzzer 120 sound port 120a, increasing the volume exiting the sound port(s) 112d. In some embodiments, the sound level can be varied between about 60 dB to about 20 dB. Other embodiments may use other suitable volume controls, e.g., a linear, pivoting or sliding control, as one of ordinary skill should appreciate. In some embodiments, the volume control controls the amount of electrical delivered to the sound generator, thus modulating the volume. In some such embodiments, the volume control includes or controls a rheostatic circuit.

When the device's on/off switch 119 is in the closed position and the circuit 115 is powered by the power source 116, the buzzer 120 will turn on and remain on as long as the CTSM 118 circuit detects an increase in capacitance change caused by proximity/contact of the touch electrode 106 by the approaching human skin 121a. The term "proximity contact" should be understood as being interchangeable with the term "in intimate contact" to describe the activation of the device's circuit 115 and that the CTSM 118 does not require physical forces as an activation stimulus. In at least some embodiments, the sensitivity of the touch electrode 106 is configured to keep the "turn on" proximity distance (distance between skin surface and the touch electrode 106) to be less than about half a millimeter. The buzzer 120 or other suitable alerting device (e.g., a light source, vibrator, etc.) is activated by capacitive change increase sensed by the CTSM 118 when the trail DWJA of twenty-five degrees is reached or acceptably close. The buzzer 120 or other alerting devices remains activated as long as the trail DWJA remains about twenty-five degrees or higher. For example, when the trail DWJA of twenty-five degrees is reached or exceeded at the top of the backswing and sustained to impact of the golf club with the golf ball, the circuit 115 is activated and alerts the trainee with a sustained signal that Lag has been properly performed (positive feedback). The trainee will thus understand that a brief alert signal occurring at the start of or during the downswing that terminates as the trainee continues the downswing (before ball impact) is not ideal. The trainee can then self-train to sustain the alert, and thus the desired DWJA, longer. When the trail DWJA of twenty-five degrees is not reached, no alert signal is given, thus informing the trainee that the entire downswing from the top of the backswing to impact with the golf ball was not performed correctly (negative feedback).

Figure 14:
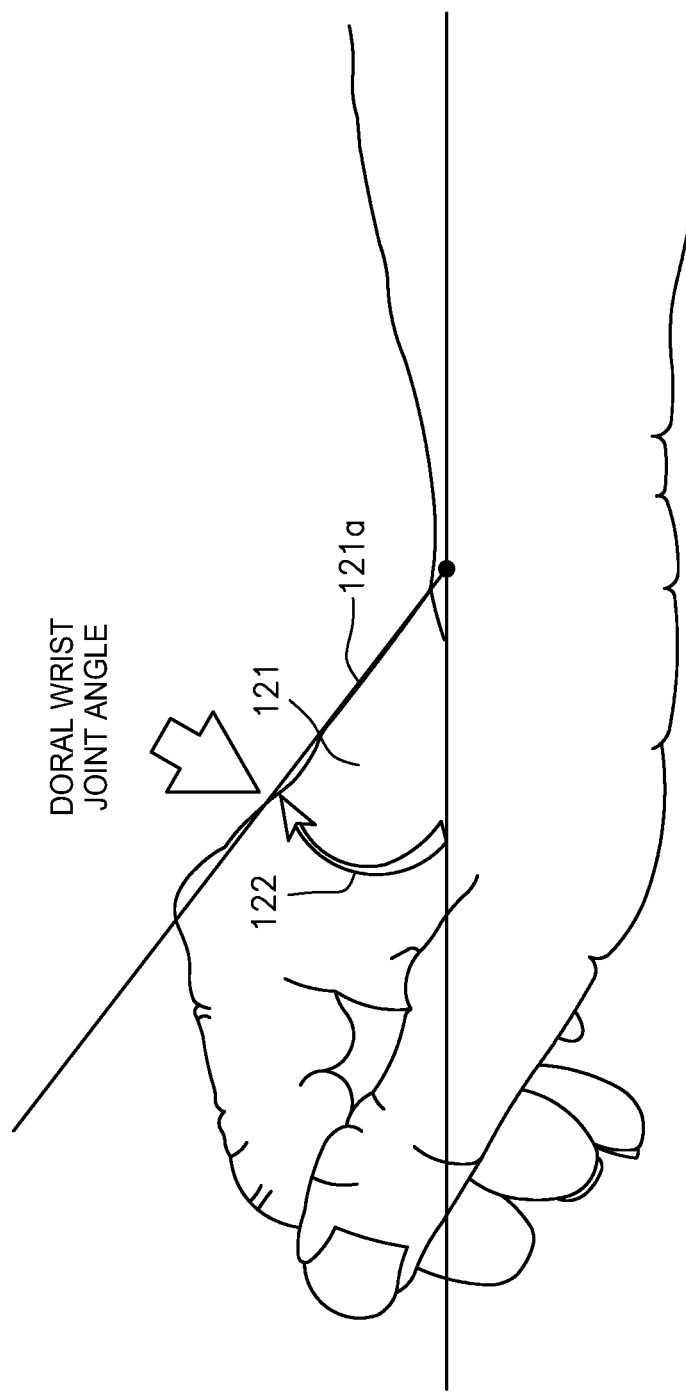
FIG. 14 is an annotated side view of a human hand and forearm.

Turning now to FIG. 14, an angle 122 that represents the "Dorsal Wrist Joint Angle" (DWJA) is shown. The DWJA is the angle formed between the dorsal surface of the hand and the adjacent surface of the forearm. At the maximal extension the human wrist, the DWJA is measured to be about seventy degrees. When the dorsal extension is fully removed, the DWJA is zero degrees. The device 101 in the illustrated embodiment is designed to activate when the DWJA is equal to or greater than twenty-five degrees or thereabout. The device's circuitry then provides a positive feedback to the training golfer. The positive feedback alerts the golfer that the golf swing from the top of the backswing to impact of the golf club with the golf ball is properly performed and that Lag has been created and sustained. Negative feedback by the absence of an alert or termination of an alert prior to golf ball impact informs the training golfer that the downswing was performed improperly and Lag was not created.

Figure 15:
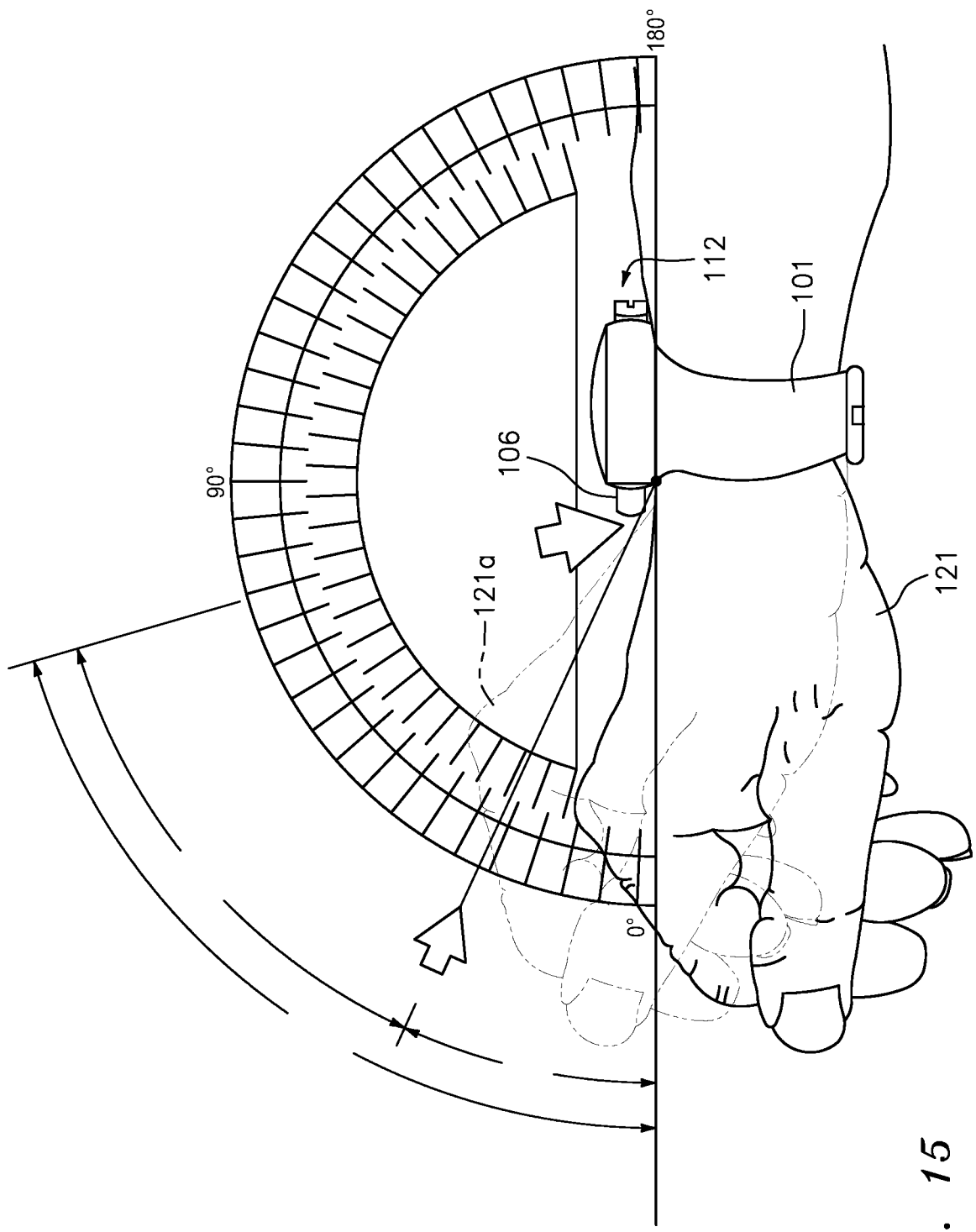
FIG. 15 is an annotated side view of a human hand and forearm in two positions of dorsal extension.
Figure 16:
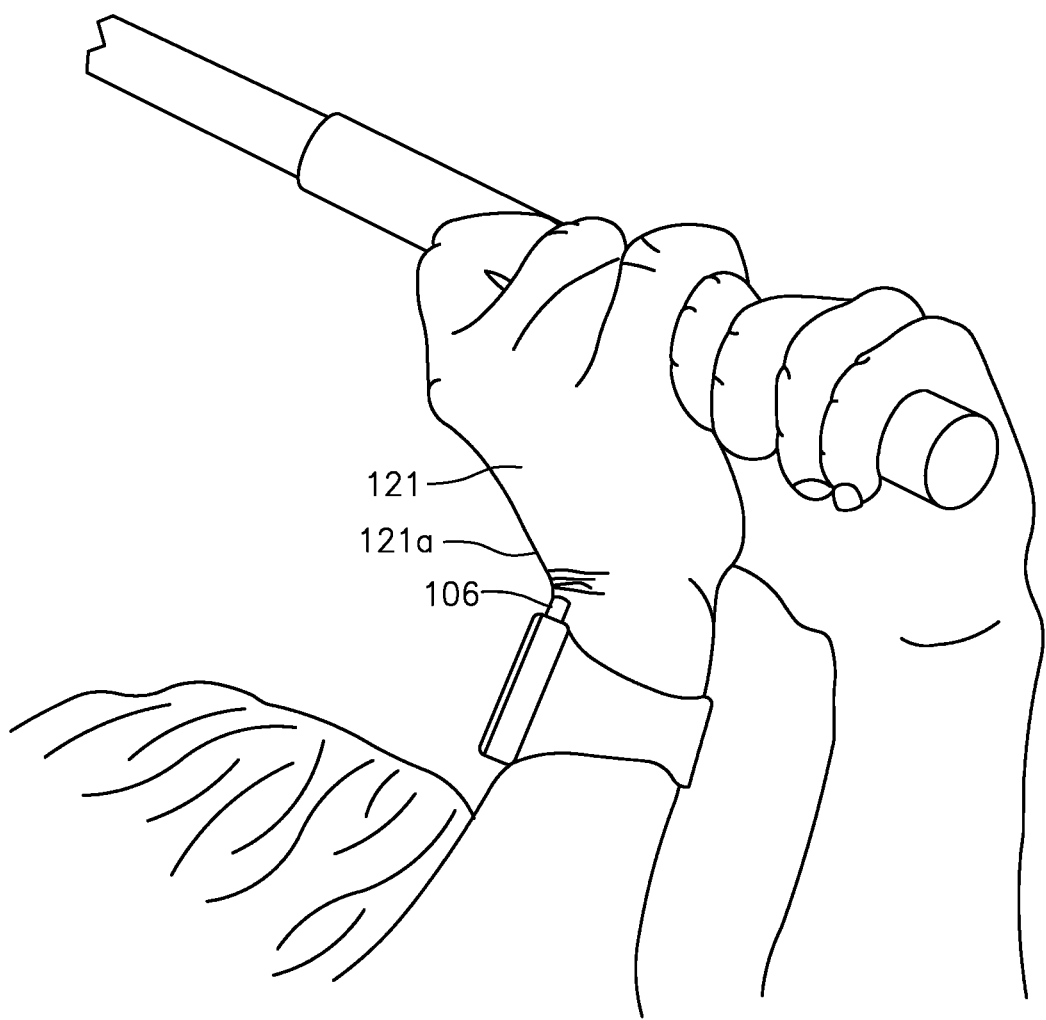
FIG. 16 is a view of hands and forearms of a golfer at the top of a golf backswing.

FIG. 15 is an anatomical/schematic drawing of the DWJA of the right human hand 121 in two positions of dorsal extension—zero degrees and twenty-five degrees. As seen in the figure, when the DWJA reaches twenty-five degrees, the touch electrode 106 senses the approach/contact of the dorsal surface 121a of the hand 121, the circuit 115, activating the device 101 to emit the alarm to the user through the sound generator 112. When the DWJA is below twenty-five degrees, the circuit 115 is not activated. When the device 101 is worn like a watch on the trail wrist and secured, the touch electrode point 106 is positioned or can be adjustably positioned by the adjustable stem 108 to properly sense the trail DWJA FIG. 16 is a close-up drawing of a golfer. It depicts the golfer's hands, wrists and forearms at the top of the backswing at the beginning of the downswing. The golfer's trail wrist is maximally hinged at a seventy degree DWJA. The device 101 is secured on the golfers trail wrist. The touch electrode 106 of the device 101 is in contact with the dorsal surface 121a of the golfer's trail hand 121. The circuit 115 of the device 101 is activated and the adjustable sound unit 112 of the device 101, alerting the golfer that the proper DWJA of twenty-five degrees has been obtained.

Figure 17:
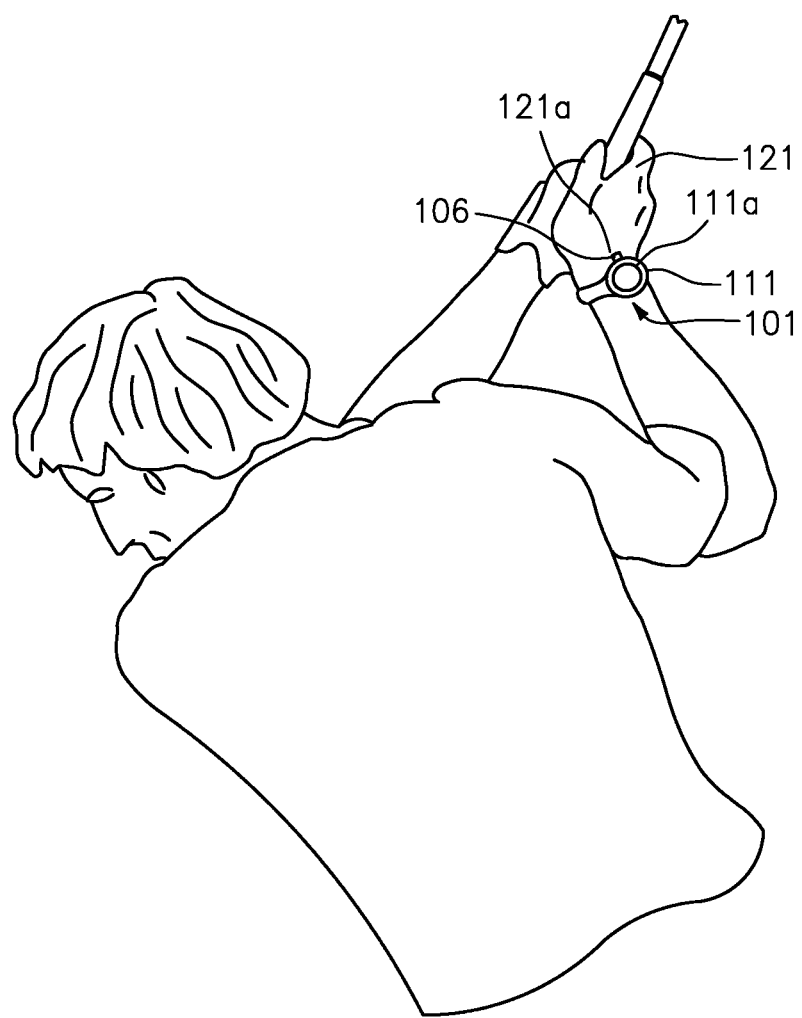
FIG. 17 is a view of the upper portion of a golfer's body from the rear during a golf backswing.

FIG. 17 shows a broader view of a golfer's upper body during a golf backswing (e.g., just about to start the downswing). The golfer is wearing the device 101 on the golfer's trail wrist. The trail wrist hinge angle DWJA is greater than twenty-five degrees. In the position shown, the touch point electrode 106 is in contact with the dorsal surface 121a of the golfer's trail hand 121. In this position of dorsal extension/DWJA, the alarm will be activated, indicating to the golfer that the desired DWJA of twenty-five degrees has been reached.

The touch point electrode 106 is positioned on the forward side 111a of the enclosure 111. The touch point electrode 106 is adjustably positionable by the use of the retractable stem 108 so that the touch point electrode 106 in contact with the dorsal surface 121a of the trail hand 121 when the trail wrist hinges about one-third of its maximal hinge angle (about seventy degrees). Thus the device 101, when secured to the trail wrist, will position the touch point electrode 106 so that it is in contact with the dorsal surface 121a of the trail hand 121 when the DWJA is equal to or greater than 25 degrees. The circuit 115 will then be activated and the adjustable sound unit 112 will alert the golfer that proper Lag has been obtained.

Figure 18:
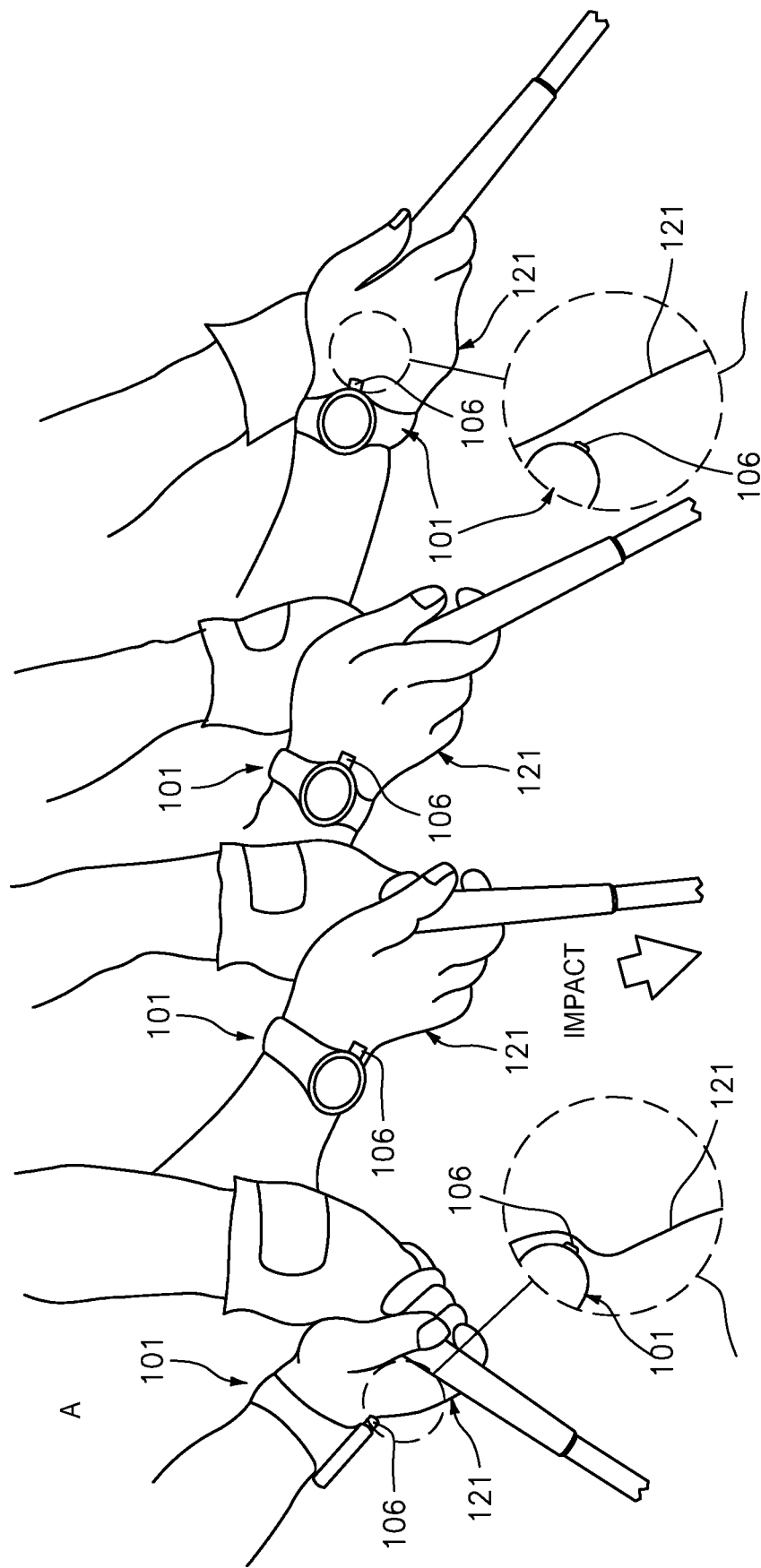
FIG. 18 is a view of a golf swing at different points in time.

FIG. 18 is another anatomical drawing showing the device 101 attached to a golfer's trailing wrist by way of an adjustable strap 102. A golf club is represented in the golfer's trailing hand for reference only. The device 101 has a form similar to an ordinary watch and is inconspicuous and non-bulky in comparison thereto. The drawing shows close-up views of a golfer's wrists at different points of the downswing of the golf club. Position A shows the golfer's wrists as the golfer swings the golf club during the downswing to the position of the golfer's lead foot. At this time, the touch electrode point 106 is in contact with the dorsal surface 121a of the trail hand 121 because the DWJA is greater than twenty-five degrees. Thus, the circuit 115 is activated and the adjustable sound unit 112 alerts the golfer that proper Lag is present. Position B shows the same golfer's wrists as the golfer swings the golf club during the downswing just as the golf club approaches impact with the golf ball. As depicted, the DWJA is still greater than twenty-five degrees and the touch electrode point 106 is in contact with the dorsal surface 121a of the golfer's trail hand 121. The circuit 115 remains activated, and the sustained activation alerts the golfer that Lag has been properly maintained approaching impact with the golf ball. Position C shows the same golfer's wrists as the golfer's golf club has begun the follow through phase of the golf swing. The golf ball has been impacted as the golfer's trail forearm pronates the trail wrist and hand and the lead forearm supinates the lead wrist and hand. The trail DWJA is now less than twenty-five degrees, and so the proposed device's circuit 15 is not activated and the alert has ceased. Position D shows the same golfer's wrists as the golfer continues the follow-through. Because the trail DWJA is (still) less than twenty five degrees no alert is present. As the follow through is completed and the DWJA remains less than twenty-five degrees, no alert is heard.

FIG. 18 also contains close-ups of areas E and F near the touch point electrode 106. As seen in area E, the touch electrode point 106 is in contact/proximity with the dorsal surface 121a of the golfer's trail hand 121. As shown, the trail DWJA is at least at twenty-five degrees, and the tissue/skin over the dorsal surface 121a of the golfer's trailing hand 121 is pushed towards the touch point electrode 106. At this point, the skin fold of the dorsal surface 121a of the trail hand 121 and the touch point electrode 106 are in proximity/contact with each other. That is, as the skin fold of the dorsal surface 121a approaches the touch point electrode 106, the circuit 115 begins to sense an increase in capacitance change. The circuit 115 is activated only when the increase in capacitance change has met a sufficient threshold as the dorsal surface 121a of the trail hand is sufficiently close to the signal zone in front of the touch point electrode 106. As discussed above, this may be about a half-millimeter distance between the skin fold and the electrode 106. The use of a small surface area for the electrode 106 and the shielding 107 around the stem 108 provides that the signal zone around the touch point electrode 106 is mostly projected forward away from the touch point electrode 106 less than a half a millimeter.

As seen in area F, the trail DWJA is less than twenty-five degrees and the dorsal surface 121a of the golfer's trail hand 121 is not in proximity/contact with the touch point electrode 106, and the circuit 115 is not activated. The touch electrode 106 and the dorsal surface 121a of the golfer's trail hand 121 is out of range of the signal zone emitted from the electrode 106, and the circuit 115 does not sense an increase in capacitance change.

Figure 19:
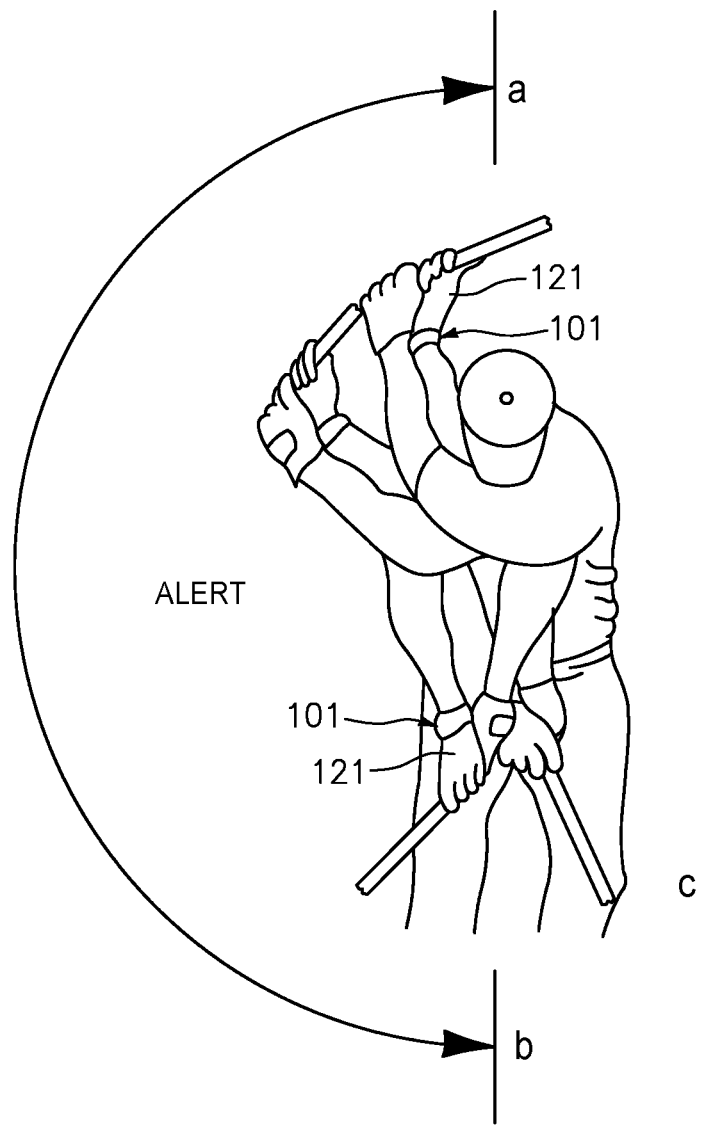
FIG. 19 shows a front view of a golfer's golf swing at different points in time.

FIG. 19 is an anatomically drawn representation of the device 101 used during the training of a golfer during the part of the golf swing from the top of the backswing (a) to impact of the golf club and the golf ball (b) (labeled "Downswing"). As indicated in the drawing, the device 101 is activated and is alerting the training golfer that desired and fully sustained Lag has been obtained throughout the downswing (labelled "Alert"). As illustrated, when proper Lag is obtained the device 101 is sensing the trail DWJA at positon (a) equal to or greater than twenty-five degrees, circuit 115 is activated, and the adjustable sound unit 112 is turned on and alerting the training golfer. As the downswing continues, the trail DWJA remains equal to or greater than twenty-five degrees and the device 101 continues to be activated and the alert is sustained. The sustained alert continues until the golf club makes impact with the golf ball at position (b), informing the trainee that proper Lag has been maintained through the downswing. After the swing progresses past position (b) toward position (c), the alert stops because the trail DWJA becomes less than twenty-five degrees.

On the other hand, the device 101 will not be activated at position (a) if the trail DWJA is not twenty-five degrees or greater as the training golfer begins the downswing. Even if activated at position (a), the alert will not be sustained if the DWJA decreases below twenty-five degrees during the downswing. Thus, training golfer, by receiving only a brief, non-sustained alert, and/or short time duration noted on the time duration display 105 will be informed the desired sustained Lag has not been obtained and that further training/practice is needed.

In use, the device 1, 101 is attached to the golfer's trail wrist with the retainer 2, 102 so that the enclosure 11, 111 is against the dorsal surface of the wrist with the sensor 6, 106 oriented in the forward direction toward the golfer's hand 18, 121. If the device 1, 101 is not on or not in an active state, the golfer can turn the device 1, 101 on using the on/off switch 3, 103. The golfer then swings the club. If, at the top of the backswing, the sensor 6, 106 sense the dorsal surface 21, 121a of the golfer's trail hand 18, 121, i.e., because the DWJA is at least about the desired DWJA (twenty-five degrees in this application), the circuit 15, 115 will be activated, and the alarm 13, 112 will activate, e.g., generate an audio, visual and/or tactile signal, which indicates that proper DWJA has been reached. If, during the downswing until impact of the golf club with the ball, prior DWJA is maintained, the sensor 6, 106 will continue to sense the dorsal surface 21, 121a of the golfer's trail hand 18, 121, the circuit 5, 115 will remain activated, and the alarm 13, 112 will continue to generate the alarm signal. If the alarm signal is generated at the top of the backswing and until impact of the golf club with the ball, the alarm signal will be continuous, indicating to the golfer that the DWJA was proper during the entirety of the downswing. On the other hand, if the alarm signal is not generated at the top of the backswing or generated at the top of the backswing but not sustained through the downswing, e.g., is short and/or intermittent, the golfer is informed that proper DWJA was not achieved and further training practice is required.

After the golfer completes the swing, the golfer can activate the lag time activation switch 4, 104 to display in the display/readout 5, 105 the elapse time of lag in seconds and/or the device alerts made. In embodiments where the alarm includes an auditory alert, the golfer can adjust the volume of the alert using the protrusion 112.

As discussed above, a golfer may need to adjust the position of the sensor 6, 106. If the sensor 6, 106 detects the user's skin and thus activates the circuit 15, 115 and the alarm too soon, i.e., before the DWJA reaches the desired DWJA, the golfer may adjust the position of the sensor 6, 106 so that the sensor 6, 106 does not activate the circuit 15, 115 and alarm until the DWJA reaches the desired DWJA. Conversely, if the sensor 6, 106 detects the user's skin and thus activates the circuit 15, 115 and the alarm too late, i.e., after the DWJA reaches the desired DWJA, the golfer may adjust the position of the sensor 6, 106 so that the sensor 6, 106 activates the circuit 15, 115 and alarm when the DWJA reaches the desired DWJA.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A device comprising:
   a housing;
   a retainer attached to the housing and configured to retain the housing on a dorsal surface of a user's wrist;
   a sensor external to the housing and positioned and configured to sense proximity with skin of a dorsal surface of a user's hand attached to the wrist when a dorsal wrist joint angle of the wrist is at least a predetermined angle of twenty-five degrees; and
   an alarm operatively connected with the sensor and configured to, upon the sensor sensing proximity with said skin, generate an alarm signal to the user.

2. A device as defined in claim 1, wherein the alarm is configured to generate said alarm signal only when the sensor senses proximity with the skin.

3. A device as defined in claim 1, wherein a position of the sensor relative to the housing is adjustable so that the sensor senses proximity with the skin when the dorsal wrist joint angle is at least the predetermined angle and not when the dorsal wrist joint angle is less than the predetermined angle.

4. A device as defined in claim 1, wherein the sensor is configured to sense proximity with the skin when the skin is within about a half-millimeter from the sensor.

5. A device as defined in claim 1, wherein the sensor includes a capacitive touch switch module.

6. A device as defined in claim 1, wherein the alarm signal is auditory, visual and/or tactile.

7. A device as defined in claim 1, wherein the alarm signal is auditory and a volume thereof is selectively adjustable by the user.

8. A device as defined in claim 1, further including a timer to time a duration of lag during a downswing of a golf club by the user.

9. A device as defined in claim 8, wherein the housing includes a display configured to display to the user said duration of lag time and how many alarm signals were generated by the alarm during said downswing.

10. A device comprising:
    a housing;
    first means for retaining the housing on a dorsal surface of a user's wrist;

second means for sensing proximity with skin of a dorsal surface of a user's hand attached to the wrist when a dorsal wrist joint angle of the wrist is at least a predetermined angle of twenty-five degrees; and third means for, upon the second means sensing proximity with said skin, generating an alarm signal to the user.

11. A device as defined in claim 10, wherein the first means defines a retainer, the second means defines a sensor, and the third means defines an alarm.

12. A method comprising:

sensing with a sensor of a device located on a dorsal surface of a user's wrist proximity with skin of a dorsal surface of a user's hand attached to the wrist when a dorsal wrist joint angle of the wrist is at least a predetermined angle of twenty-five degrees; and generating, upon the sensor sensing proximity with said skin, an alarm signal to the user.

13. A method as defined in claim 12, including not generating an alarm signal when the sensor does not sense proximity with said skin.

14. A method as defined in claim 12, wherein said sensing step includes sensing proximity with the skin when the skin is within about a half-millimeter from the sensor.

15. A method as defined in claim 12, wherein the sensing step includes using capacitance of the skin to sense said proximity.

16. A method as defined in claim 12, wherein the generating step includes generating an auditory, visual and/or tactile alarm signal.

17. A method as defined in claim 12, including timing (i) a duration of time that the sensor senses said proximity during a downswing of a golf club by the user and/or (ii) a duration of time that the alarm generates an alarm signal during a downswing of a golf club by the user.

18. A method as defined in claim 17, including displaying on a display of the device said duration of time that the sensor senses said proximity and/or said duration of time that the alarm generates an alarm signal.

* * * * *